US007057107B2

(12) United States Patent  (10) Patent No.: US 7,057,107 B2
Auray et al. (45) Date of Patent: Jun. 6, 2006

(54) SNAP FIT ELECTRICAL CONNECTOR ASSEMBLY WITH CONICAL OUTER SNAP FIT RETAINER AND EXTERNALLY MOUNTED INTERNAL WIRE RETAINER

(75) Inventors: Delbert Auray, Southport, CT (US); Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/258,990

(22) Filed: Oct. 26, 2005

(65) Prior Publication Data

US 2006/0054343 A1   Mar. 16, 2006

Related U.S. Application Data

(63) Continuation-in-part of application No. 11/151,374, filed on Jun. 13, 2005, which is a continuation-in-part of application No. 11/100,250, filed on Apr. 6, 2005, which is a continuation-in-part of application No. 10/939,619, filed on Sep. 13, 2004, now Pat. No. 6,916,988.

(51) Int. Cl.
 *H02G 3/06* (2006.01)
(52) U.S. Cl. .................. 174/65 R; 174/65 G; 174/68.1; 174/68.3; 174/72 C; 174/69; 174/70 R; 174/71 R; 439/92; 439/587; 439/320; 439/557; 439/535; 439/567; 439/142
(58) Field of Classification Search ............. 174/65 R, 174/65 G, 68.1, 68.3, 72 C, 69, 71 R; 439/92, 439/587, 320, 557, 535, 567, 142
See application file for complete search history.

(56) References Cited

U.S. PATENT DOCUMENTS

| 1,483,218 A | 2/1924 | Fahnestock |
| 1,725,883 A | 8/1929 | Recker |
| 1,830,250 A | 11/1931 | Tiefenbacher |
| 2,156,003 A | 4/1939 | Tinnerman |
| 2,160,353 A | 5/1939 | Conners |
| 2,445,663 A | 7/1948 | Peters |
| 2,744,769 A | 5/1956 | Roeder et al. |
| 2,823,932 A | 2/1958 | Schigut |
| 3,183,297 A | 5/1965 | Curtiss |
| 3,436,105 A | 4/1969 | Miklya |
| 3,544,705 A | 12/1970 | Winston |
| 3,631,738 A | 1/1972 | Harper |

(Continued)

*Primary Examiner*—Dean A. Reichard
*Assistant Examiner*—Anton Harris
(74) *Attorney, Agent, or Firm*—Fattibene & Fattibene; Arthur T. Fattibene; Paul A. Fattibene

(57) ABSTRACT

An electric connector assembly having a connector body defining an inlet end portion and an outlet end portion interconnected by a through bore wherein the outlet end portion is provided with a tapering frustro conical surface that is circumscribed by an external retainer ring of a frustro conical shape complementing the frustro conical outer surface of the outlet end portion. The conical external retainer ring also includes locking and grounding tangs arranged to effect a snap fit connection of the connector assembly to a knock-out hole of an electric box or panel. The electric connector assembly further contemplates the use of internal wire conductor retainer associated with the inlet end portion so as to effect the attachment of an electric wire conductor thereto with a snap fit in a manner that prohibits any unintentional separation of the electric wire conductor therefrom.

15 Claims, 13 Drawing Sheets

U.S. PATENT DOCUMENTS

| | | | |
|---|---|---|---|
| 3,788,582 A | 1/1974 | Swanquist | |
| 3,814,467 A | 6/1974 | Van Buren, Jr. | |
| 3,858,151 A | 12/1974 | Paskert | |
| 3,993,333 A | 11/1976 | Biswas | |
| 4,012,578 A | 3/1977 | Moran et al. | |
| 4,021,604 A | 5/1977 | Dola et al. | |
| 4,032,178 A | 6/1977 | Neuroth | |
| 4,248,459 A * | 2/1981 | Pate et al. | 285/319 |
| 4,361,302 A | 11/1982 | Lass | |
| 4,468,535 A | 8/1984 | Law | |
| 4,619,332 A | 10/1986 | Sheehan | |
| 4,621,166 A | 11/1986 | Neuroth | |
| 4,626,620 A | 12/1986 | Plyler | |
| 4,657,212 A | 4/1987 | Gilmore et al. | |
| 4,711,472 A | 12/1987 | Schnell | |
| 4,773,280 A | 9/1988 | Baumgarten | |
| 4,880,387 A | 11/1989 | Stikeleather et al. | |
| 4,981,310 A | 1/1991 | Belisaire | |
| 4,990,721 A | 2/1991 | Sheehan | |
| 5,132,493 A | 7/1992 | Sheehan | |
| 5,171,164 A | 12/1992 | O'Neil et al. | |
| 5,189,258 A | 2/1993 | Pratesi | |
| 5,266,050 A | 11/1993 | O'Neil et al. | |
| 5,342,994 A | 8/1994 | Pratesi | |
| 5,422,437 A * | 6/1995 | Schnell | 174/65 R |
| 6,034,326 A * | 3/2000 | Jorgensen | 174/65 R |
| 6,043,432 A | 3/2000 | Gretz | |
| 6,080,933 A | 6/2000 | Gretz | |
| 6,114,630 A | 9/2000 | Gretz | |
| 6,133,529 A | 10/2000 | Gretz | |
| 6,194,661 B1 | 2/2001 | Gretz | |
| 6,335,488 B1 | 1/2002 | Gretz | |
| 6,352,439 B1 | 3/2002 | Stark et al. | |
| 6,355,884 B1 | 3/2002 | Gretz | |
| 6,380,483 B1 | 4/2002 | Blake | |
| 6,444,907 B1 | 9/2002 | Kiely | |
| 6,476,322 B1 * | 11/2002 | Dunne et al. | 174/68.1 |
| 6,555,750 B1 | 4/2003 | Kiely | |
| 6,604,400 B1 | 8/2003 | Gretz | |
| 6,670,553 B1 | 12/2003 | Gretz | |
| 6,682,355 B1 | 1/2004 | Gretz | |
| 6,737,584 B1 | 5/2004 | Kiely | |
| 6,768,057 B1 | 7/2004 | Blake | |
| 6,780,029 B1 | 8/2004 | Gretz | |
| 6,849,803 B1 | 2/2005 | Gretz | |
| 6,872,886 B1 | 3/2005 | Kiely | |
| 6,860,758 B1 | 5/2005 | Kiely | |
| 6,916,988 B1 | 7/2005 | Auray et al. | |

* cited by examiner

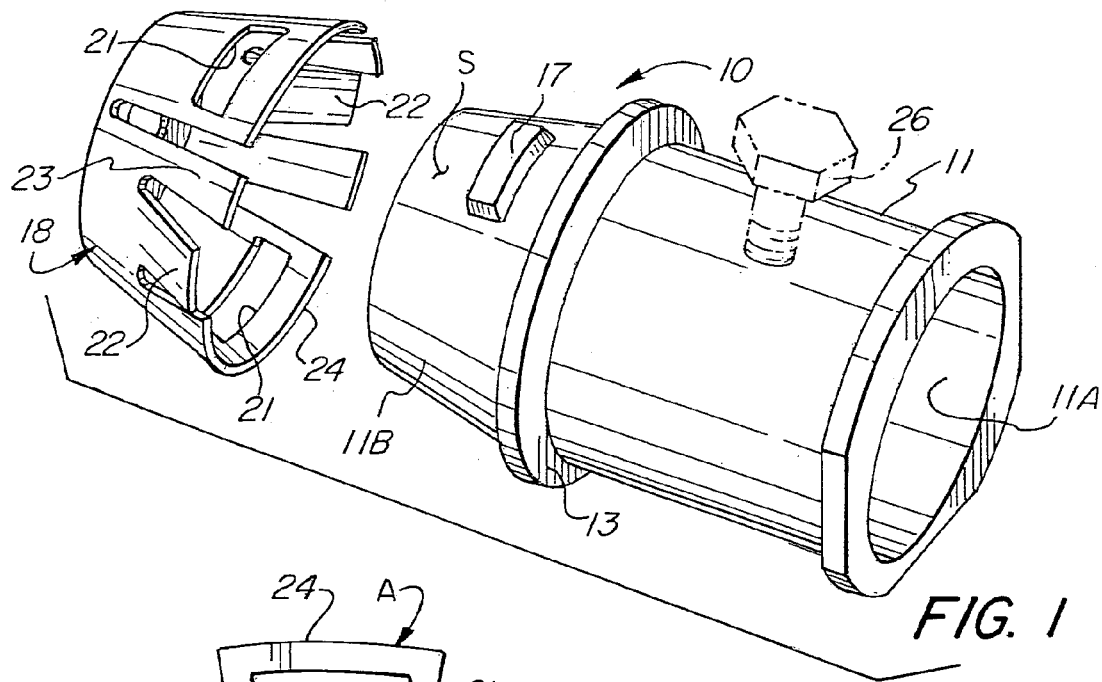
FIG. 1
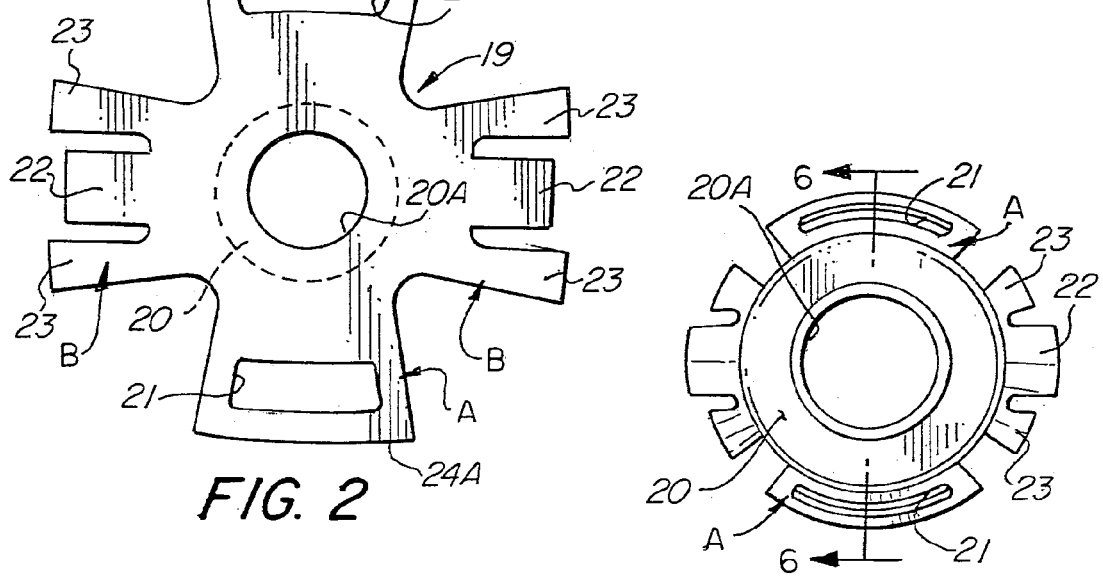
FIG. 2
FIG. 3
FIG. 5
FIG. 4

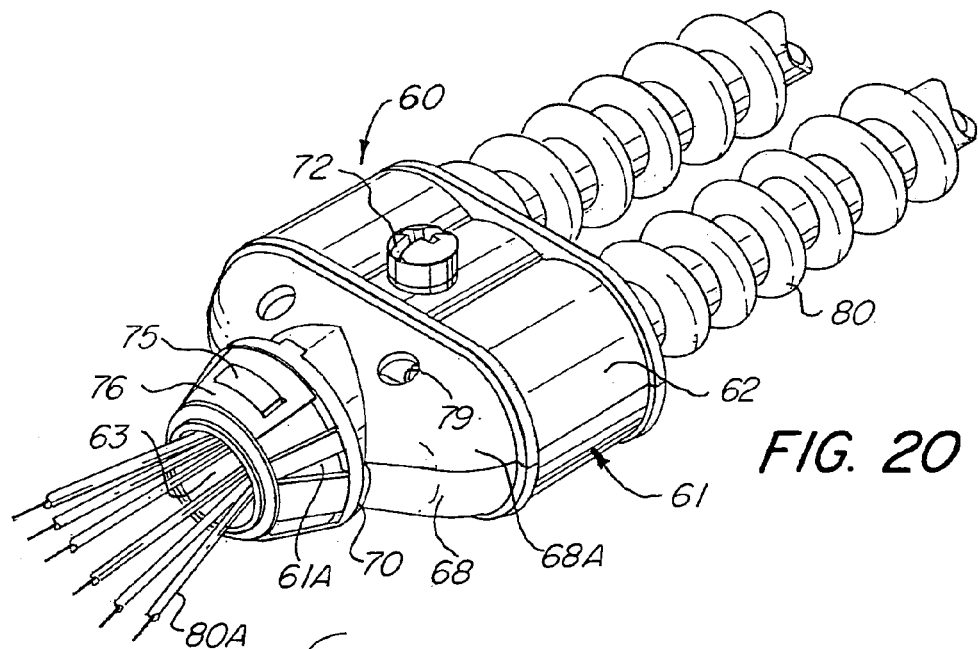
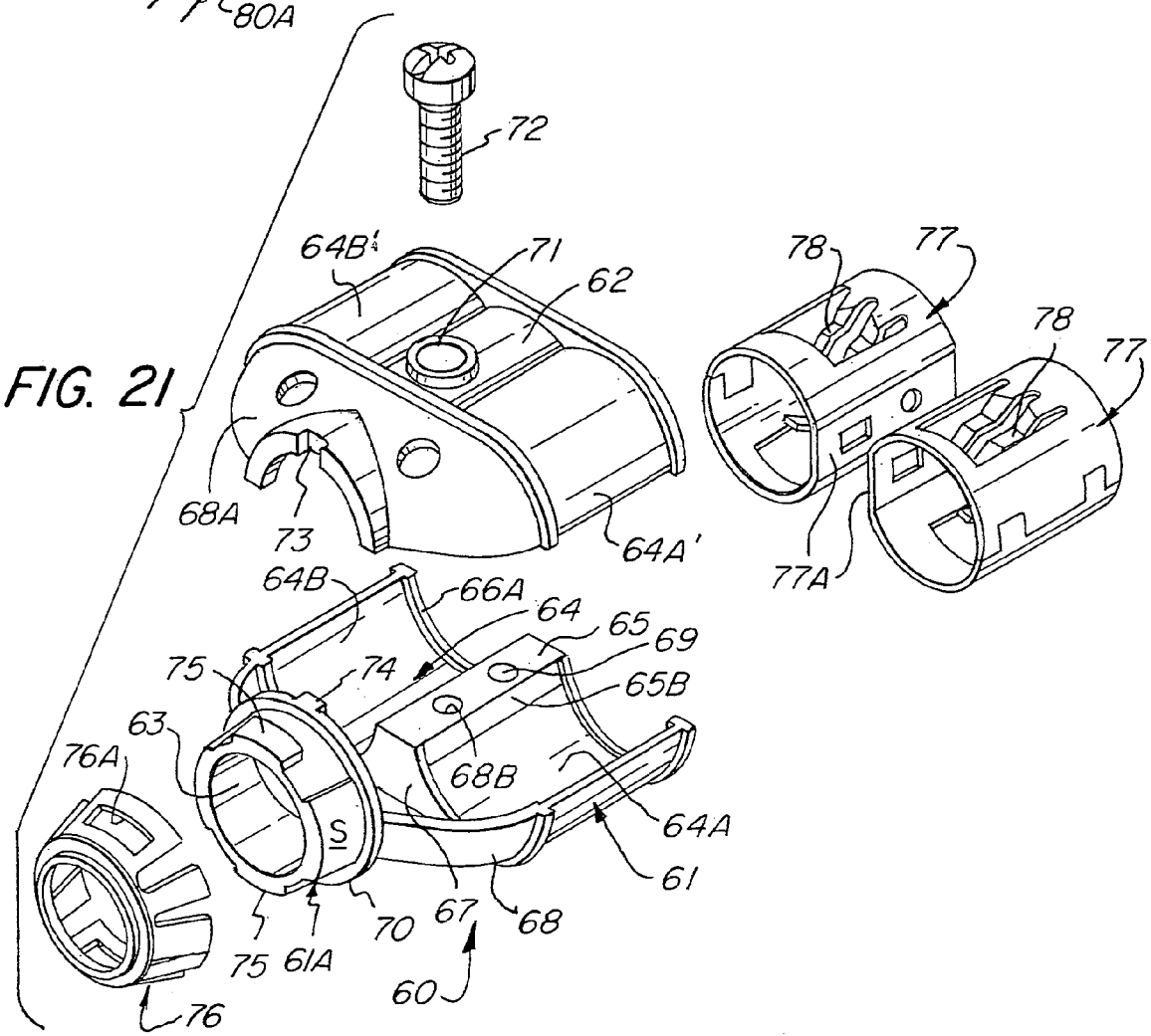

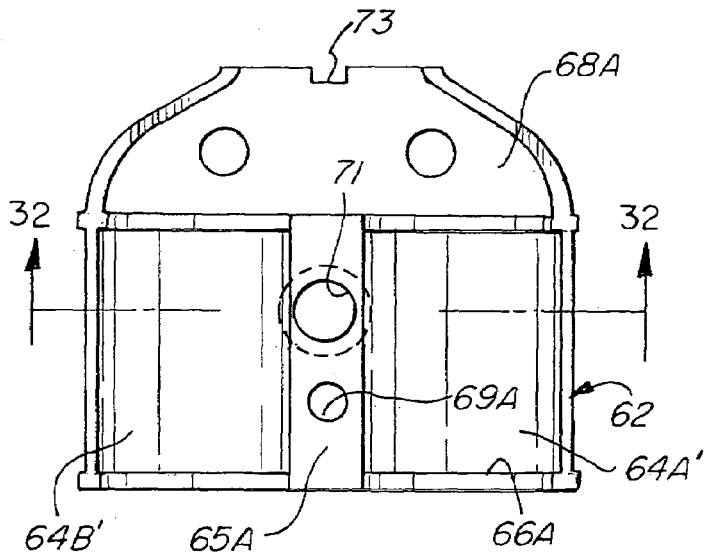
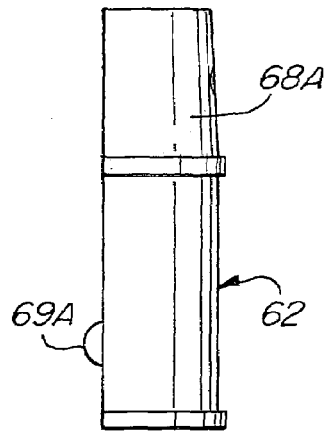
FIG. 28  FIG. 29
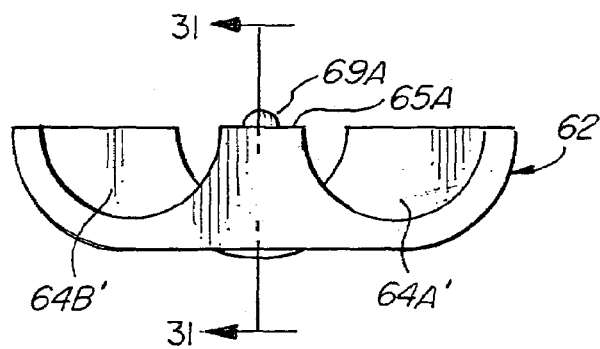
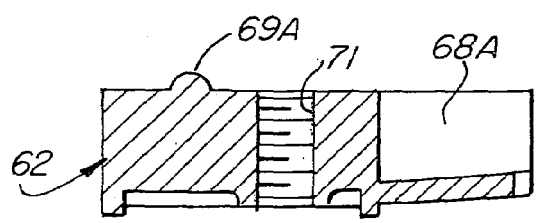
FIG. 30
FIG. 31
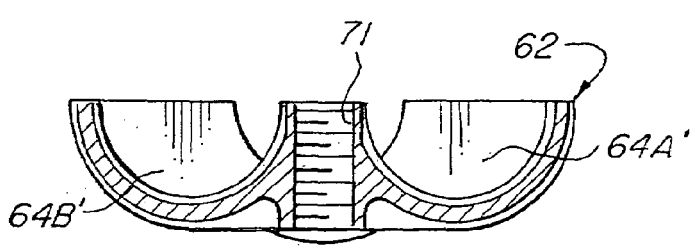
FIG. 32

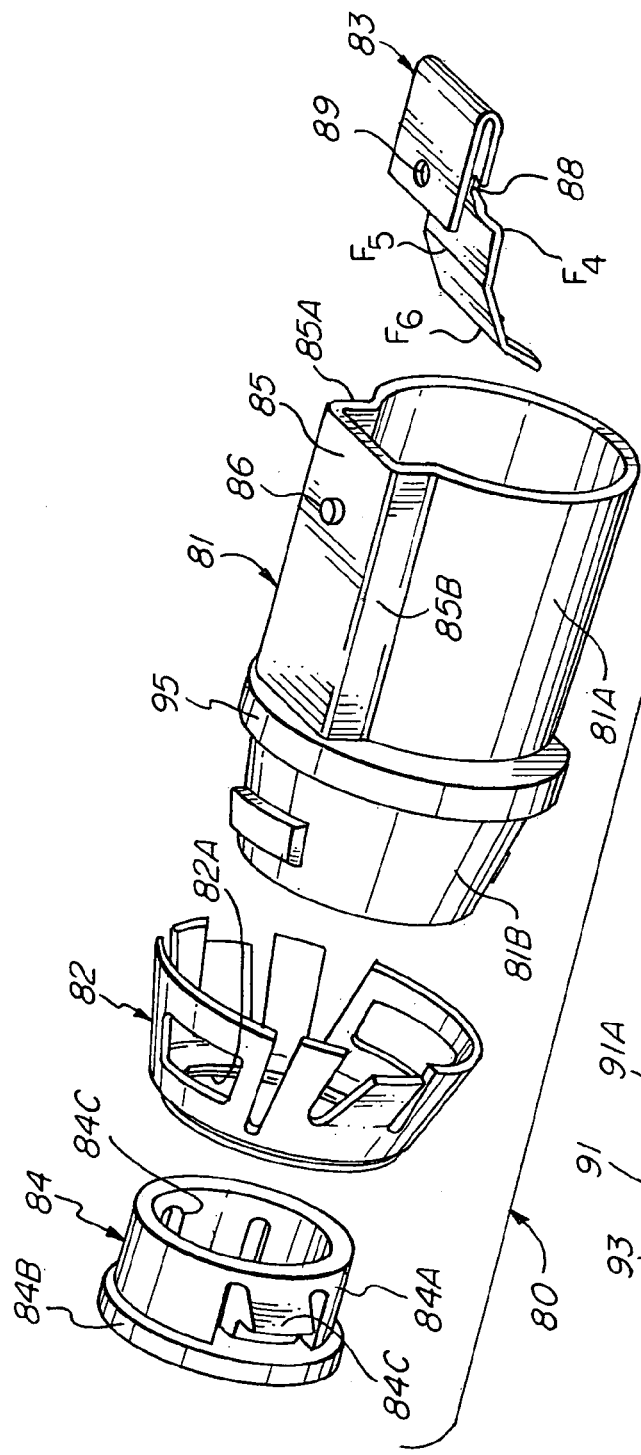
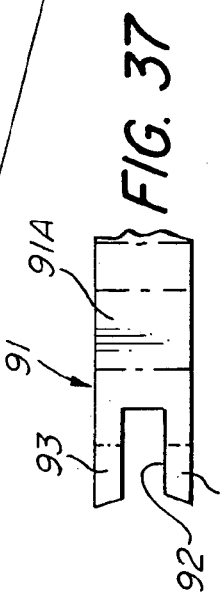
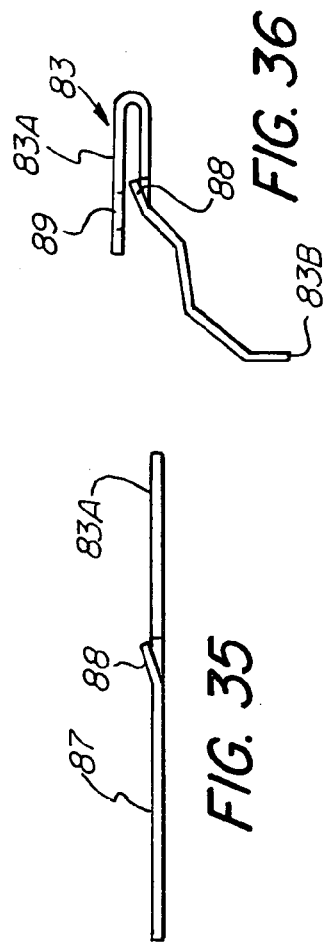
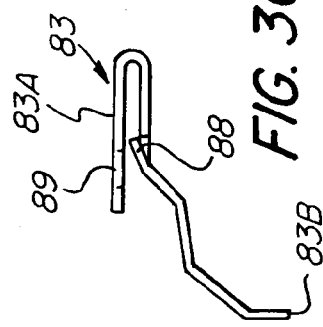

SNAP FIT ELECTRICAL CONNECTOR ASSEMBLY WITH CONICAL OUTER SNAP FIT RETAINER AND EXTERNALLY MOUNTED INTERNAL WIRE RETAINER

RELATED APPLICATIONS

This application is a continuation in part application of application Ser. No. 11/151,374 filed Jun. 13, 2005 for Snap Fit Electrical Connector Assembly With conical Outer Snap Fit Retainer And One Or More Internal Snap Fit Wire Retainers, which is a continuation in part of application Ser. No. 11/100,250 filed Apr. 6, 2005 for Snap In Electrical Connector Assembly With Unidirectional Wire Conductor Retainer Ring, which is a continuation in part application of application Ser. No. 10/939,619 filed Sep. 13, 2004 for Electrical Connector With Frustro Conical Snap Fit Retaining Ring, now U.S. Pat. No. 6,916,988 B1.

FIELD OF THE INVENTION

This invention is directed to a further advancement in the field of electrical connector assemblies having a snap fit retaining ring circumscribing the outlet end of a connector body for effecting a snap fit connection to an electrical box of the types described in U.S. Pat. No. 6,860,758, and co-pending application Ser. No. 10/790,283 filed Mar. 1, 2004 for Snap Fitting Electrical Connector; and in a co-pending application Ser. No. 11/028,373 filed Jan. 3, 2005, which co-pending applications are incorporated herein by reference.

More specifically, this invention relates to a snap fit electrical connector for facilitating the connection of an electrical connector and associable cable, wire, conductors or the like to an electrical box, which is provided with a readily detachable snap fit outer frustro-conical member circumscribing the outlet end of a connector body for simplifying its connection to an electric box and a unidirectional cable or wire retainer associated with the inlet end of the connector for positively securing a wire, cable or conductor to the inlet end of the connector so as to prohibit any unintentional separation of the wire, cable or electrical conductor from the connector.

BACKGROUND OF THE INVENTION

Electrical connectors are commonly used for attaching electrical conductors, cables, wires, electrical metal tubing (EMT) or the like to an electric box, e.g. a junction box, outlet box, switch box, fuse box, or other similar type of electric box. Such known electrical connectors are either of a type that are secured to an electric box by a threaded lock nut or by means of a circular snap fit retaining ring of the type disclosed in U.S. Pat. Nos. 6,860,758; 6,444,907; 5,189,258; 5,266,050; 5,171,164; 2,744,769 and 1,483,218 for example. Reference is also made to U.S. Pat. No. 6,768,057 which is directed to a right angle type connector formed of a pair of sheet metal stampings fitted together and secured to an electrical box with a snap fit arrangement. Connectors formed as connector caps which are adapted to be fitted over the end of a conductor, cable or wires, such as disclosed in U.S. Pat. No. 4,880,387, are also known. Various other known efforts to facilitate the connection of an electrical conductor to an electric box are evidenced by U.S. Pat. Nos. 6,043,432; 6,080,933; 6,114,630; 6,133,529; 6,194,661; 6,335,488; 6,352,439; 6,355,884; 6,444,907; 6,555,750; 6,604,400; 6,670,553; 6,737,584; 6,682,355; 6,780,029 and 6,849,803. While such prior known connectors can be satisfactorily used for their intended purposes, efforts are constantly being made to improve upon the known electrical connectors. The disclosure herein comprises but another effort to advance or improve the manner of forming and/or securing electrical connectors and/or conductors to an electric box.

SUMMARY OF THE INVENTION

An object of this invention is to provide an electrical connector with a frustro-conically shaped retaining ring having integrally formed locking tangs and electrical grounding tangs.

Another object of this invention is to provide for an electrical connector assembly that includes an electrical connector body having an outlet end with a frustro-conical outer surface having a complementary frustro-conical retaining ring that is readily fitted to and retained on the outlet end portion of the connector body.

Another object is to provide a connector assembly comprising a connector body having an outlet portion free of any retaining flanges and an associated snap fit retainer ring circumscribing the outlet end portion.

Another object is to provide a retaining ring having a face portion with outwardly flaring circumscribing arms or sides having locking and grounding tangs that are readily formed out of a surface of the respective arms or side.

Another object is to provide a retaining ring, adapted to be fitted onto the outlet end of a connector body, having a frustro-conical shape with a first series of tangs for securing the connector body relative to an electrical box and a second series of tangs for effecting a positive electrical ground with an associated electrical box.

Another object is to provide a frustro-conically shaped retaining ring that can be readily formed from a blank of spring steel.

Another object is to provide an electrical connector with a frustro-conical outer retainer ring circumscribing the outer surface of the connector outlet end and a unidirectional retainer ring or sleeve associated with the inlet end of the connector for securing an electrical wire or conductor thereto.

Another object is to provide an electrical connector with an internal unidirectional sleeve insert for frictionally retaining a wire conductor to the connector so as to prevent any unintentional separation of a wire conductor therefrom.

Another object is to provide an electrical connector with an outer frustro-conical retainer ring for attaching a connector to an electrical box with a snap fit and an inner unidirectional retainer ring or sleeve for securing a wire conductor thereto in a manner to prohibit any unintentional separation of the wire conductor from the connector.

Another object is to provide an electrical connector with an improved wire retainer sleeve or ring whereby the wire conductor is positively secured thereto by simply inserting the wire conductor into the connector whereby unintentionally separation of the wire conductor from the connector is prohibited.

Another object of this invention is to provide an electrical connector with a wire retainer ring whereby a helical wound wire conductor can be secured upon mere insertion of the armored conductor wire or by threading the armored conductor wire into the wire retainer ring so as to prohibit any unintentional separation of the wire conductor from the electrical connector.

Another object is to provide or an electrical connector assembly that is relatively simple to fabricate and positive in operation.

Another object of this invention is to provide an electrical connector assembly having an outer frustro conical retainer ring for positively connecting the connector assembly to an electrical box and having multiple inlet ends fitted with an internal wire retainer ring for unidirectional locking therein a wire conductor in each of the multiple inlets.

Another object of this invention is to provide an improved multiple connector assembly that is relatively simple in structure, easy to assemble and having a minimum of component parts.

Another object is to provide a connector assembly having multiple inlet ends, each inlet end being fitted with internal spring steel internal retaining ring arranged to maximize electrical conductivity or grounding.

Another object is to provide an electrical connector having an outer frustro-conical retainer ring forming a snap fit attachment to an electric box or panel and having an improved unidirectional wire conductor retainer in the form of a retaining finger projecting into the inlet end of a connector body so as to provide a snap fit wire retention device which prohibits any unintentional separation of the wire conductor form the connector.

Another object is to provide a relatively simple and positive acting snap fit wire conductor retaining device for securing and retaining a wire conductor to an electrical connector in a manner to prohibit any unintentional separation of a wire conductor from the connector.

Another object is to provide a snap fit wire retainer that extends inwardly of an electrical connector body constructed so that the wire retainer is externally secured to the exterior of the connector body so as to facilitate the assembly of the connector and associated wire retainer.

Another object is to provide an electrical connector having a wire retainer arranged to be externally secured to the connector in a fixed relationship relative to the connector so that the free end thereof extends in the inlet end portion of the connector whereby a wire conductor may be snap fitted thereto.

The foregoing objects and other features and advantages are attained by an electrical connector assembly that includes a connector body having an inlet end portion for receiving an electrical conductor and an outlet portion which is adapted to be inserted through a knockout hole of an electrical panel or electric box, e.g. an electric outlet box or the like. A radially outwardly extending flange circumscribes an intermediate portion of the connector body to function as a stop to limit the insertion of the outlet end portion of the connector body through the knockout hole of an electric box. The outlet end portion may be provided with an outer surface that converges or tapers inwardly toward the outlet opening thereof. Formed on the surface of the outlet end portion are one or more retaining lugs, which may be circumferentially spaced about the outlet end portion. A frustro-conically shaped snap ring is fitted onto the outlet end portion.

In accordance with this invention, the outer retaining ring is initially formed from a blank of sheet material, e.g. spring steel, having a cruciform shape that includes a face portion with a central opening wherein the radiating arms of the cruciform blank are disposed about the face portion to define a frustro-conical ring or cup. The ring so formed is provided with blanked out or die cut tangs to define locking tangs and grounding tangs. The frustro-conical ring so formed also has a slot adapted to receive the retaining lug when the retaining ring is fitted onto the outlet end portion of the connector body so that the free or trailing ends of the ring or grounding tangs engage the inner periphery of the knockout hole of an electric box for effecting positive electrical continuity and grounding.

To form the retaining ring, the cruciform arms are arranged to be folded relative to the front or face forming portion of the blank, which is provided with a central opening, to define a unitary frustro-conically shaped cup-like member to compliment or be fitted to the outlet end portion of the connector body. The retaining ring thus formed is fitted over or onto the outlet end portion whereby the retaining slot formed in the ring is adapted to receive the complementary retaining lug formed on the surface of the outlet end portion for retaining the ring on the outlet end portion of the connector body.

With the construction described, the connector assembly can be readily inserted through the knockout opening of an electric box wherein the locking tangs will spring outwardly to lock the connector assembly to the electric box with the grounding tangs or free ends of the arms being biased or urged against the internal periphery of the knockout hole to effect a positive electric ground, due to the inherent resiliency of the respective tangs and the material from which they are formed.

This invention further contemplates providing the inlet end of the connector with an inner or internal retainer ring which is uniquely formed for positively securing thereto a wire conductor by merely inserting the wire conductor into the inner retainer ring, and whereby the wire conductor is prohibited from being unintentionally separated therefrom. The inner retainer ring is preferably formed of a blank of spring metal material which is rolled to form a cylinder or sleeve having an outer diameter which can be frictionally retained within the inlet end of a connector, e.g. by a press or friction fit.

A further embodiment of the disclosed invention utilizes a simplified clamping arrangement for securing the wire conductor to the inlet end of the connector by a mere insertion. In the event the wire conductor has a helical wound armored shield, e.g. a BX wire conductor, such armored wire conductor may be alternatively secured to the wire retainer ring or sleeve by threading the armored conductor to the wire retainer ring or sleeve.

A further embodiment of the invention utilizes a connector body having complementary housing or body sections which can be mated together and secured by a fastener. One of the body sections is formed wih a leading end that is provided with an outer frustro conical surface and a trailing end having multiple chambers interconnected to the leading end by a transition section. The other body section defines a trailing end complementing the trailing end portion of the other housing section. An outer frustro conical retainer ring circumscribes the leading end to provide a snap fit connection of the assembled connector body to a knockout hole of an electric box. The respective chambers, defined by the mated complementary trailing ends, are each fitted with a spring steel retainer sleeve to provide a snap fit connection between a wire conductor and its corresponding inlet end of the assembled connector body section. The arrangement is such that the respective wire retainer is securely clamped between the respective body section to provide a very positive surface to surface contact between the wire retainer and the associated body sections to enhance the electrical continuity between the assembled connector body sections and the wire retainer clamped therebetween.

A still further embodiment of the invention utilizes a modified connector body provided with a frustro conical outlet end having a frustro conical shaped external snap fit retaining ring by which the connector assembly can be readily attached to an electrical panel or electrical box by a snap fit, and having a uniquely formed wire retainer device that clips onto the inlet end of the connector body and is externally secured to the connector body for enhancing ease of assembly while providing the wire retainer to extend into the inlet end of the connector body with sufficient flexibility and range of movement for retaining a wire conductor or conductor sheath within the connector body in a manner to prohibit any unintentional separation of the wire conductor or sheath from the connector body.

IN THE DRAWINGS

FIG. 1 is an exploded perspective view of the electrical connector assembly.

FIG. 2 is a plan view of the blank from which the outer retaining ring of the present invention is formed.

FIG. 3 is a detail front view of the outer retainer ring.

FIG. 4 is a detail top plan view of the outer retainer ring.

FIG. 5 is a detail end view of FIG. 4.

FIG. 20 is a perspective view of a further embodiment of the invention.

FIG. 21 is an exploded perspective view of the embodiment of FIG. 20.

FIG. 28 is an inside plan view of the complementary housing section of the embodiment illustrated by FIG. 20.

FIG. 29 is an end view of FIG. 28.

FIG. 30 is an inlet end view of FIG. 28.

FIG. 31 is a sectional view taken on line 31—31 on FIG. 30.

FIG. 32 is a sectional view taken on line 32—32 on FIG. 28.

FIG. 33 is a perspective exploded view of a further embodiment of the invention.

FIG. 34 is a top plan view of the blank from which the wire retainer device is formed.

FIG. 35 is a side view of the blank of FIG. 34.

FIG. 36 is a side view of the blank of FIGS. 34 and 35 as formed to define wire retainer.

FIG. 37 is a top view of a slightly modified form of a wire retainer.

DETAILED DESCRIPTION

Figure 6:
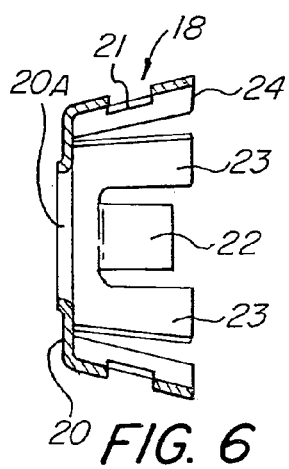
FIG. 6 is a sectional view of the outer retainer ring taken along line 6—6 on FIG. 3.

Referring to the drawings, there is shown in FIG. 1 an electrical connector assembly 10. The connector assembly 10 includes a connector body 11, which is usually formed of metal casting, e.g. zinc or other suitable metallic alloy. The connector body 11 is formed with an inlet end portion 11A and an outlet end portion 11B and having a bore 12 extending therethrough. Intermediate the connector body 11 or between the inlet end portion 11A and outlet end portion 11B there is provided a radially outwardly extending flange 13 which functions as a stop to limit the amount that the connector body 11 may be inserted through the knockout hole 14 of an electric box 15, as noted in FIG. 8.

Figure 8:
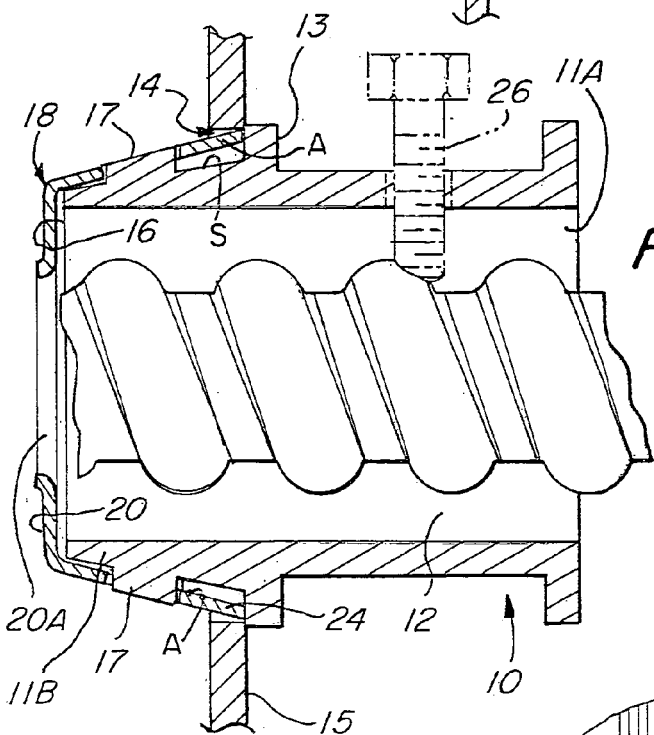
FIG. 8 is a section side view illustrating the connector assembly secured to an electric box, taken along line 8—8 on FIG. 10.
Figure 10:
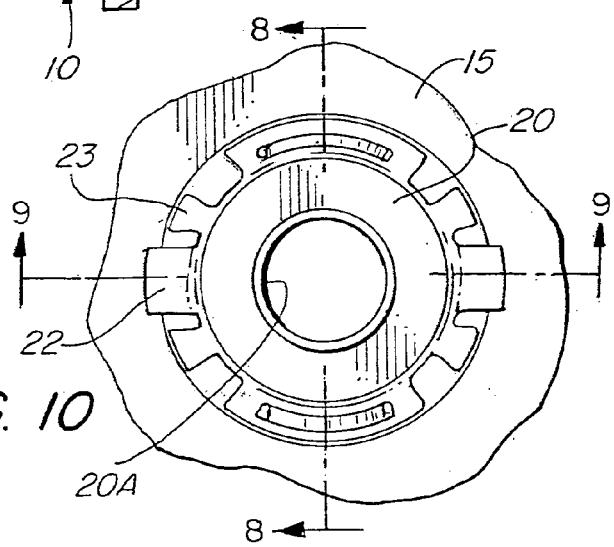
FIG. 10 is a fragmentary front view of the connector assembly secured to an electric box as viewed from the inside of the electrical box.

As shown in FIGS. 1 and 8, the outer surface S of the outlet end portion 11B slopes, tapers or converges toward the outlet opening 16 whereby the outer surface S of the outlet end portion 11B has a generally frustro-conical configuration. Formed on the surface S of the outlet end portion 11B is an outwardly projecting retainer lug 17. In the illustrated embodiment, two such lugs 17 are shown disposed 180° apart about the outer circumference of the outlet end portion 11B.

The connector assembly 10 also includes a snap fit retaining ring 18. In accordance with this invention, the retaining ring 18 is integrally formed from a blank 19 of spring steel material. As best seen in FIG. 2, the blank 19 is initially formed or stamped to define a generally cruciform shape. The cruciform shape is provided with a face portion 20 having central opening or hole 20A and having four generally radially extending arms defining two pairs of oppositely disposed arms AA and BB.

Figure 9:
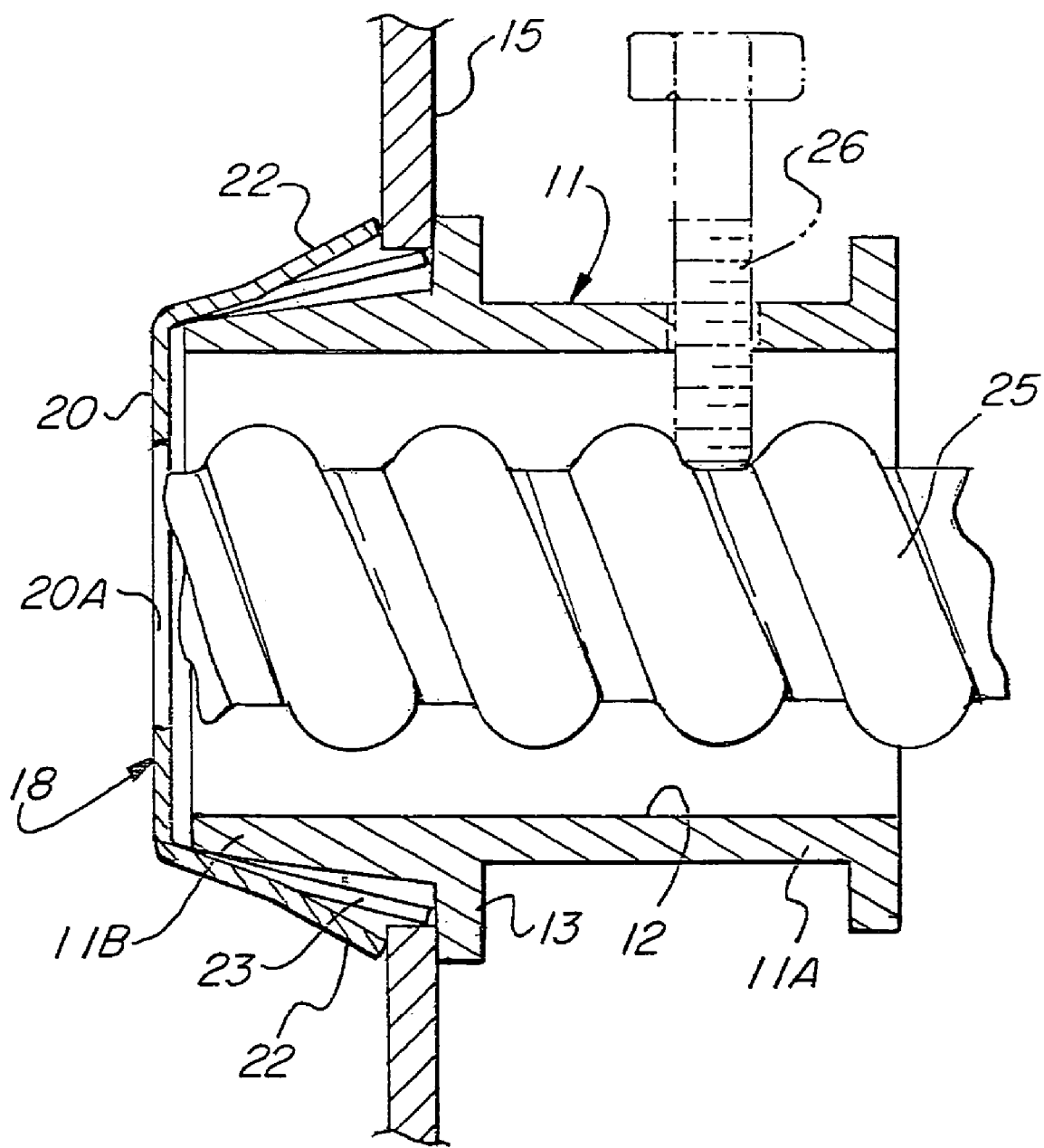
FIG. 9 is a sectional side view taken along line 9—9 on FIG. 10 and rotated 90°.

As illustrated in FIG. 2, the opposed pair of arms AA are each provided with a retaining slot 21. The opposed pair of arms BB, as best seen in FIG. 8, are blanked or formed to define a locking tang 22 and to either side thereof an electrical grounding tang 23, 23. As shown, the locking tang 22 is slightly shorter than the adjacent grounding tangs 23, 23. The arrangement is such that the free end of the locking tangs 22 are formed so as to engage the inside surface of the electric box 15 in the assembled portion, as best seen in FIG. 9, to secure the connector assembly 10 to the electric box 15 and prohibit any unintentional withdrawal of the connector assembly 10 from the electrical box 15, whereas the free ends of the grounding tangs 23 are biased in engagement with the internal periphery of the knockout hole 14. Also, the free ends 24, 24 of arms AA in the assembled position will also function as electrical grounding tangs, as noted in FIG. 8.

In forming the retaining ring 18 from blank 19, the respective arms AA and BB are subjected to a series of progressive bending dies which will gradually bend the respective arms about a foldline f, which defines the face or front portion 20, whereby arms AA and BB form a cup having circumscribing frustro-conical or outwardly flaring sides to define a frustro conical ring 18 which complements the conical surface S of the leading or outlet end portion 11B, as seen in FIG. 1. In doing so, the locking tangs 22 are outwardly and cantileverly bent or displaced relative to the surface of the ring at a slightly greater outwardly angle or slope than the adjacent grounding tangs 23 and the slope of arms AA. With the retaining ring 18 so formed, it can be readily fitted onto the outlet end portion 11B whereby the inherent resiliency of the arms AA will cause the retainer slots 22 to snap fit onto the retaining lug 17 when slots 21 are placed in alignment with lugs 17. The arrangement is such that the retainer ring 18 will be firmly and positively secured to the outlet end portion 11B as seen in FIG. 8. Yet, due to the inherent resiliency of the material of the retaining ring 18, it can be easily detached from the outlet end portion 11B when removal is desired, without destroying the ring 18 by lifting arms AA free of the retaining lugs 17.

Figure 7:
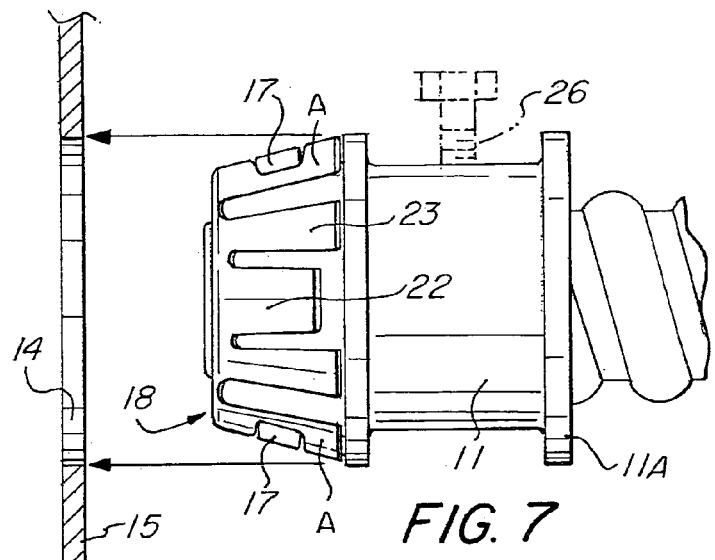
FIG. 7 is a side view of the connector assembly illustrating the alignment thereof relative to the knockout opening of an electric box.

With the retainer ring 18 properly secured to the outlet end 11B of the connector body 11, the connector assembly 10 can be readily secured to an electric box 10 by simply aligning the assembly 10 with a knockout hole 14, as best seen in FIG. 7, and inserting the leading or outlet end portion into the knockout hole 14 until the flange 13 engages the outer side of the electric box 15. In doing so, the tangs 22, 23 and the free ends 24 of arms AA, respectively, will depress inwardly to permit insertion of the assembly 10. When the assembly is fully seated in the knockout hole 14, the locking tangs 22 will normally spring outwardly to secure the assembly 10 to the electric box 15, as noted in FIG. 9. The inherent resiliency of the grounding tangs 23, 23 and the free end 24 of arms AA are normally biased in engagement with the internal periphery of the knockout hole 14 to ensure a positive electrical ground with the electric box 15. The engagement of the free ends 24 of arms AA against the inner periphery of the knockout hole 14, as noted in FIG. 8, further ensures the firm securing of the retaining slot 21 with the retaining lugs 17, so as to prohibit any disengagement of the outer retaining ring 18 from the connector body 11.

It will be understood that the wire conductor 25 may be secured to the connector assembly 10 either before or after the assembly 10 has been secured to the electric box 15. In the illustrated embodiment, the conductor wire 25 is simply inserted into the inlet end portion 11A and secured in position by a suitable securing means. In the illustrated embodiment of FIG. 1, the securing means is illustrated as a set screw 26. However, it will be understood that other conventional forms of securing means may be used, than the set screw 26 illustrated.

From the foregoing, it will be apparent that the disclosed connector assembly is quite novel and simple in construction. The snap fit retaining ring 18 can be simply formed from a cruciform shaped blank 19 whereby the opposed radially extending arms AA and BB can be readily formed into a cup having a generally frustro-conically shaped sidewalls complementing the slope of the outlet end portion 11A, and whereby the outer retainer ring 18 can be readily secured to the connector body simply by the inter-engagement of slots 21 with its complementary lugs 17.

In the assembled position, the outer retainer ring 18 is positively secured to the connector body in a manner to prohibit any unintentional separation. Also the tangs 22 and 23, which are formed integral with ring 18, are shaped and formed so that the locking tangs 22 secure the assembly 10 to an electric box 15 while the grounding tangs 23 ensure a positive electrical ground of the assembly 10 with the associated electric box 15.

Figure 11:
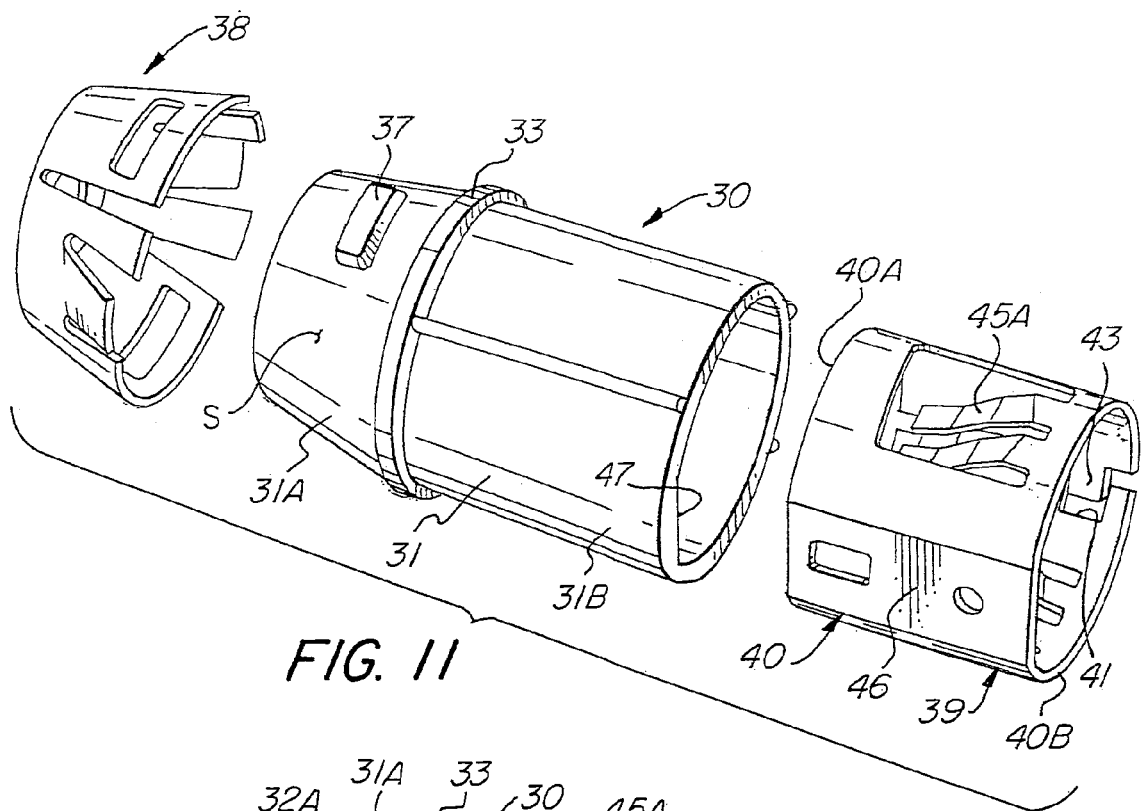
FIG. 11 is an exploded perspective view of a modified form of the invention.
Figure 12:
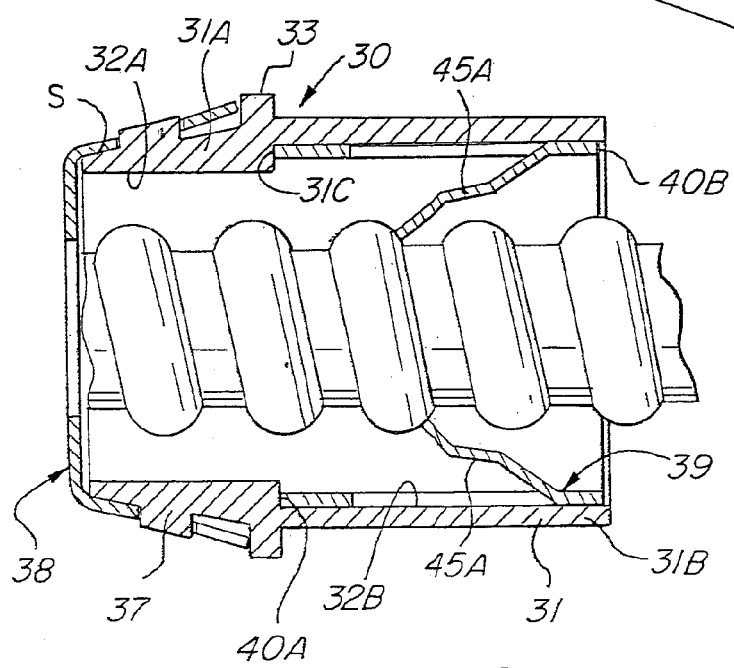
FIG. 12 is a sectional side view of the modified form of the invention of FIG. 11.

FIG. 11 illustrates a perspective view of a modified form of the invention. As illustrated in FIG. 11, the connector assembly 30 includes a connector body 31 which may be formed as a casting form of a suitable metal or alloy, e.g. zinc and the like, as hereinbefore described. The connector body 31 includes a conically shaped outlet end 31A similar to that described with respect to FIG. 1, and a cylindrical inlet end 31B. A circumscribing internal shoulder 31C is formed intermediate the opposed ends of the connector body 31. As shown in FIG. 12, the internal shoulder 31C defines the demarcation between the bore 32A defining the outlet end 31 and the bore 32B defining the bore of the inlet end. Circumscribing the connector body 31 about the exterior thereof is a radially outwardly extending stop flange 33.

The outlet end 31A of the connector body 30 is provided with opposed retaining lugs 37 adjacent the outlet opening 36. Circumscribing the sloping or conical surface S of the outlet end 31A is the outer retaining ring 38, similar to that hereinbefore described with respect to FIGS. 1 to 10.

In the embodiment illustrated in FIG. 11, the connector assembly 30 includes an internal wire retainer 39 in the form of a ring, cylinder or sleeve which is fitted to the bore 32B of the connector body 31, and which retainer 39 functions as a unidirectional retainer means arranged to permit a wire conductor to be readily inserted and secured thereinto, and which will resist any applied force imparted to the wire conductor in the opposite direction to prohibit any unintentional separation of the wire conductor from the connector body 31. Wire conductor, as used herein, means any wire, cable, helical wound metal covering or sheath (BX) wire, plastic sheath wire conductor and the like.

Figure 13:
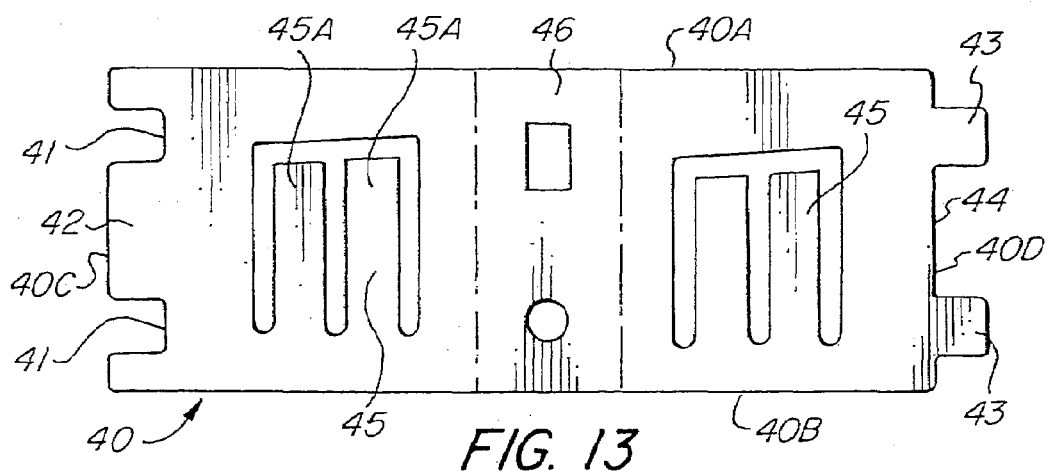
FIG. 13 is a top plan view of the blank from which the internal wire conductor retainer is formed.
Figure 14:
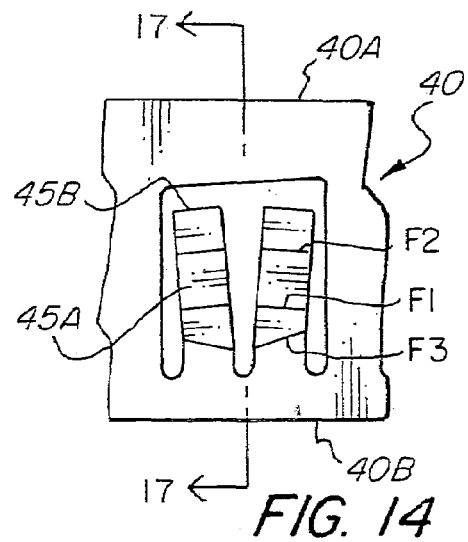
FIG. 14 is a fragmentary top view of a portion of the blank forming the inner retainer sleeve or ring.
Figure 15:
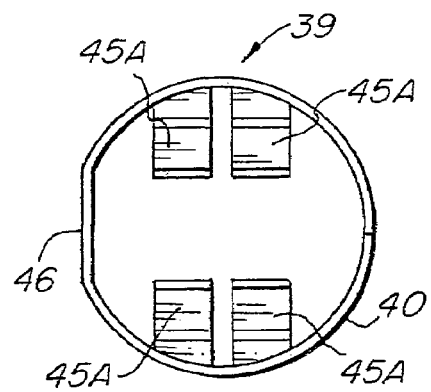
FIG. 15 is an end view of the inner wire conductor retainer ring or sleeve.
Figure 17:
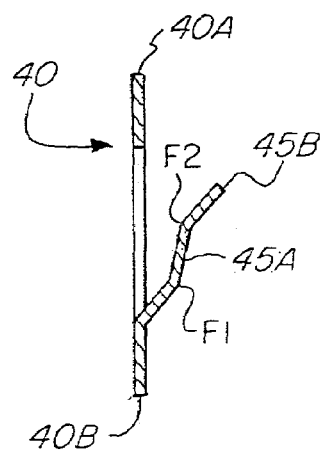
FIG. 17 is a section view taken along 17—17 on FIG. 16.

Referring to FIGS. 13 to 15, the internal retainer 39 is preferably formed from an elongated blank 40 of spring steel. The retainer blank 40, as best seen in FIG. 13, comprises an elongated generally rectangular blank having a longitudinal leading edge 40A, a trailing edge 40B and opposed end edges 40C and 40D. End edge 40C is provided with a pair of spaced apart notches 41, 41 and a projecting tongue 42. The other end edge 40D of blank 40 is provided with a pair of projecting tongues 43, 43 arranged to complement notches 41, 41 and a complementary notch 44 for receiving tongue 42 in the formed or rolled position of the retainer sleeve 39, as shown in FIG. 18.

Blanked, lanced, cut or stamped out of the plane of blank 40 are one or more tangs 45. In the form of the invention as shown in FIG. 13, tangs 45 are formed out of the plane of the blank. The respective tangs 45 are bifurcated to define a pair of finger tangs 45A, 45A longitudinally spaced along the longitudinal axis of the blank 40 at a distance, which, when the blank 40 is rolled to form the retainer sleeve 39, the respective pairs of finger tangs 45A are oppositely disposed, as best seen in FIG. 15.

Figure 18:
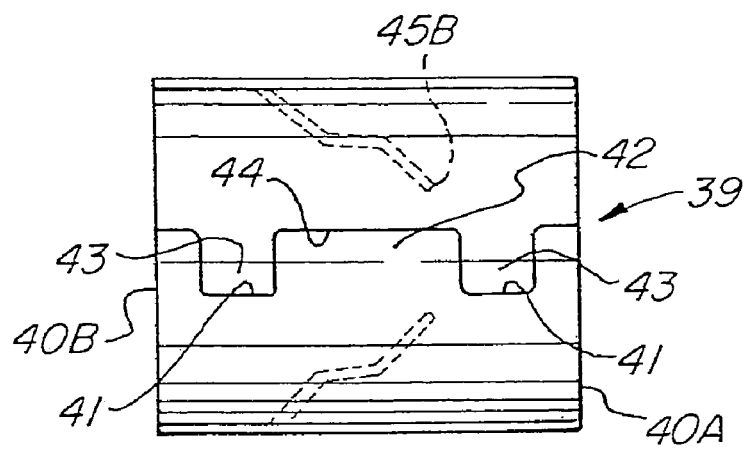
FIG. 18 is a side view of the inner retainer ring or sleeve.

As shown in FIGS. 15 and 18, the respective finger tangs 45A, 45A are inwardly bent out of the plane of the retainer sleeve 39. In the illustrated embodiment, the respective finger tangs are provided with a pair of intermediate transverse fold lines $F_1$ and $F_2$ whereby the free end of the respective finger tangs is directed toward the longitudinal axis of the sleeve 39, as shown in FIG. 18.

Referring to FIG. 15, it will be noted that the retainer sleeve is provided with a flattened portion 46 on one side thereof.

The connector body of FIGS. 11 and 12 may be formed with an internal complementary flat surface along a portion of the inner circumference thereof. The arrangement is such that the retainer sleeve 39, when inserted into the inlet end 31B of the connector body, is oriented so that the flattened surface 46 of the sleeve 39 complements the internal flattened surface 47 of the connector body. The orientation is such that the opposed finger tangs 45A are oppositely disposed to firmly grip the wire conductors, e.g. an armored conductor or other covered conductor.

The outer circumference of the inner retainer sleeve or ring 39 is proportioned so that it can be press fitted or frictionally fitted into the inlet end 31B of the connector body 31 by a force sufficient to firmly secure the inner retainer ring or sleeve 39 within the inlet end so as to prohibit any separation of the retainer ring or sleeve 39 from the inlet end of the connector body. The complementary flattened surfaces 46 of the internal sleeve 39 and 47 of the inlet end of the connector body insures proper orientation of the internal sleeve 39 within the inlet end of the connector body.

Figure 16:
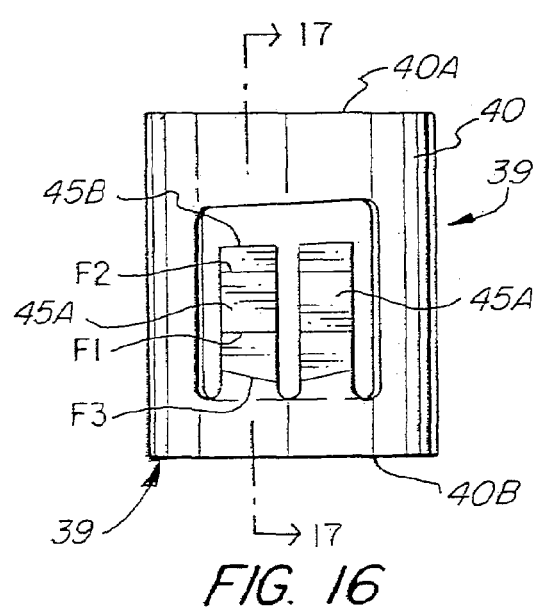
FIG. 16 is a top view of the inner retainer ring or sleeve of FIG. 15.

FIG. 14 illustrates a fragmentary portion of the blank 40 to show an intermediate step in forming the tang fingers 45A, 45A so that when the formed blank 40 is rolled to form the internal retaining sleeve, the tang fingers will be disposed in parallel as seen in FIGS. 15 and 16. This is attained by fold line $F_3$ which is disposed at an angle, as noted in FIG. 14, so that when the blank is rolled to form the internal retaining sleeve 39, the tang fingers 45A, 45A will be disposed in parallel. The free ends 45B of the respective fingers 45A are angularly offset to engage the grooves of an armored conductor, as noted in FIG. 12 or other covering sheath of a wire conductor that will resist a force attempting to effect separation of the conductor from the connector assembly. The respective free ends 45B may also be laterally offset so that an armored conductor may be threadedly connected to the internal sleeve 39, as well as by simply inserting the armored covered conductor into the retainer sleeve to effect a snap fit connection.

Figure 19:
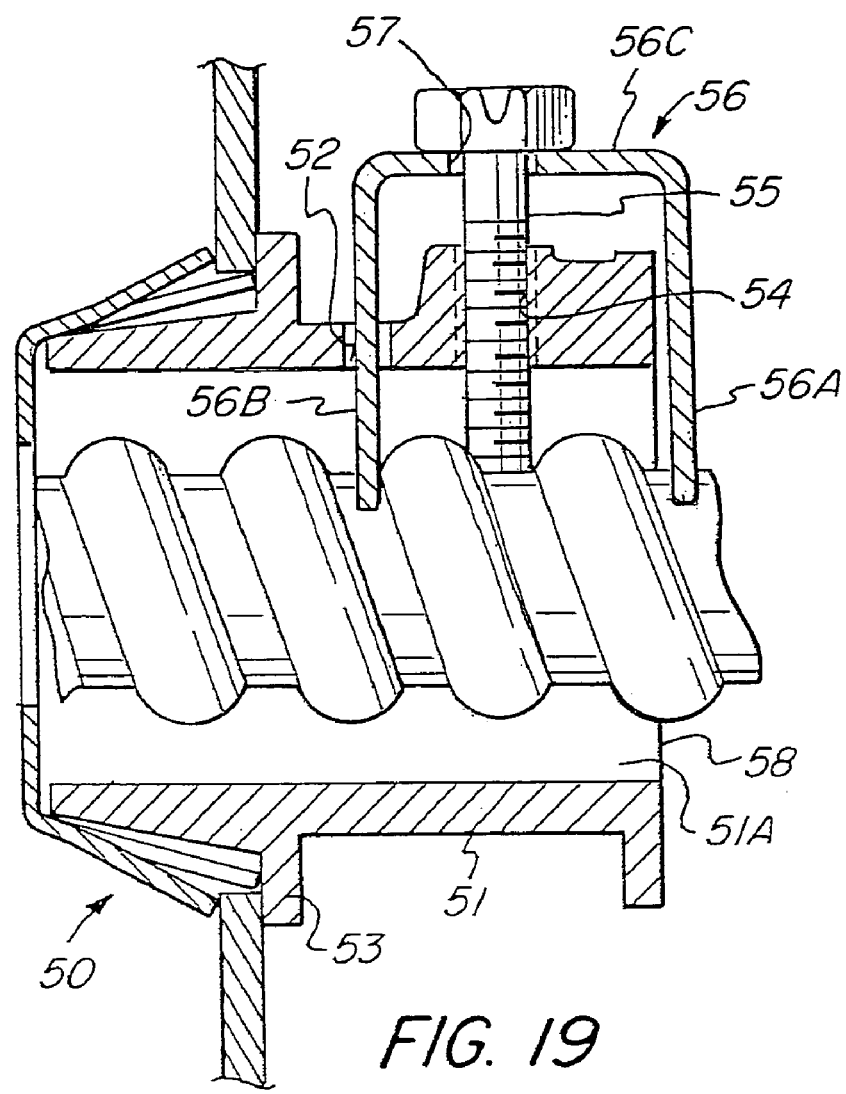
FIG. 19 is a sectional side view of still another embodiment.

FIG. 19 illustrates a further embodiment of the invention. The embodiment of FIG. 19 is directed to a connector assembly 50 which is generally similar to that disclosed in FIGS. 1 to 10. The embodiment of FIG. 19 differs from that disclosed in FIGS. 1 to 10 and FIGS. 11 to 18 in that the connector body 51 is provided with a slotted opening 52 in the inlet end 51A thereof positioned adjacent to the radially outwardly extending flange 53. Intermediate between the inlet end 51A and the flange 53, the inlet end is provided with a tapped or threaded hole 54 for receiving a set screw 55.

In this form of the invention, the wire retainer means comprises an inverted U shape clamp 56 having opposed leg portions 56A, 56B and an interconnected web 56C. The web 56C is provided with an aperture or hole 57 arranged to be disposed in alignment with the tapped or threaded hole 57. The web 56C is sufficiently wide so that one leg, e.g. leg 56B, is extended through the slotted opening 52 and the other leg 56A extends over the inlet opening 58 to the inlet end portion 51A. The retaining clamp 56 is adjustably secured to the connector body 51 by the set screw 55 extending through the aligned tapped hole or screw hole 52. By having one leg 56B extending through the slotted opening 52 and the other leg 56A extending over the inlet opening 58, the clamp 56 can be readily adjusted relative to the connector body by turning the set screw 18 in one direction or the other. The arrangement is such that as the set screw 55 is tightened, the opposed and spaced apart free ends of the respective clamp legs 56A, 56B will exert a bearing force on the wire conductor sheath to positively secure a wire conductor to the inlet end of the connector assembly. In all other respects, the connector assembly of FIG. 19 is similar to that disclosed in FIGS. 1 to 10, and need not be repeated.

FIGS. 20 to 32 are directed to a further modification of the disclosed invention. As best seen in FIGS. 20 and 21, the connector assembly 60 includes a housing or connector body formed of a pair of complementary sections or members 61 and 62. The respective complementary sections or members 61 and 62 are preferably formed as casting of any suitable metal or alloy material, e.g. zinc, aluminum and the like.

As best seen in FIG. 21, one of the housing complementary members, e.g. 61, is provided with a projecting leading or outlet end 61A, which is adapted to be inserted through a knockout hole 14 of an electric box or panel 15. The leading or outlet end 61A is formed with an annular configuration to define an outlet opening 63, through which the conductor leads or wires 80A may extend as noted in FIG. 20. The outer surface S of the leading end 61A slopes or tapers downward toward the central axis of the connector assembly to define a frustro conical outer surface S on the leading end 61A.

The complementary member 61 also includes a trailing or inlet end 64. As shown in FIG. 21, the trailing or inlet end 64 is formed as a pair of semi-cylindrical chambers 64A, 64B disposed in parallel side by side arrangement separated by an intermediate wall or division 65. The opposed ends of the respective chambers 64A, 64B are defined between an inturned lip 66A circumscribing the inlet opening 66 to the respective chambers 64A, 64B and a transverse web 67. A transition section 68 connects the respective chambers 64A–64B to leading or outlet end 61A.

Extending through the intermediate wall 65 is a tapped hole 68B having internal threads. Also formed on the wall 65 is an aligning depression or recess 69. Circumscribing the leading or outlet end 61A is a radially outwardly extending flange 70 which functions as a stop to limit the distance the connector assembly 60 can be inserted through a knockout opening 14 of an electric box or panel 15.

The complementary housing section or member 62 is formed with a pair of semi-cylindrical chambers 64A', 64B' disposed in parallel relationship and arranged to complement chambers 64A, 64B in the assembled position of the respective housing members 61, 62, as best noted in FIGS. 20 and 31. Housing member 62 is provided with a hole 71 extending therethrough which is arranged to be disposed in alignment with the tapped hole 68B whereby the respective housing sections 61, 62 can be secured in the assembled position by a threaded fastening screw 72 inserted through hole 71 and threaded into the tapped hole 68 of the other housing member 61. Housing member 62 is also provided with a transition section 68A that complements transition section 68 of the other housing member or section 61.

To facilitate the alignment of the two housing sections 61 and 62 in assembling the sections 61, 62, there are provided complementary aligning means. In the illustrated embodiment, the aligning means comprises a notch 73 formed at the leading end of the housing member 62 which is arranged to mate with a complementary projection or lug 74 formed on the outlet end portion of the housing member 61. Another alignment means includes a recess or depression 69 formed in the dividing wall 65 of housing member 61 arranged to be disposed in alignment with the projection or dimple 69A formed on the dividing wall 65A of housing member 62.

In this form of the invention, the outlet or leading end 61A is provided with retainer lug 75 projecting outwardly from the conical surface S of the outlet end 61A. In the illustrated embodiment, two such retaining lugs 75 are oppositely disposed. Disposed about the outer sloping or tapered surface S of the outlet end 61A is a frustro-conical retainer ring 76. The conical retaining ring 76 is formed and constructed in the manner hereinbefore described with respect to FIGS. 2 to 4 and need not be repeated. As seen in FIGS. 20 and 21, the frustro conical external retainer ring 76 can be readily slipped onto the outlet end 61A so that upon engagement of the retainer lugs 75 with the complementary slots 76A formed on the retainer ring 76, the retainer ring 76 is maintained in position on the external surface S of the leading or outlet end 61A as hereinbefore described.

In this form of the invention, a wire conductor retainer ring or sleeve 77 is arranged to be disposed and clamped between the complementary chambers defined by the respective housing sections or members 61, 62 when assembled. The respective wire retainer rings or sleeves 77 are similar in construction and function to that described with respect to FIGS. 13 to 16, which need not be repeated. It will be noted that dividing wall 65, 65A of the respective housing members 61, 62 are arranged to engage the flat area 77A of the respective wire retainer sleeves 77 thereby functioning as a means for effecting proper orientation of the respective wire retainer sleeves 77 within their respective chambers in the assembled position of the housing sections or members 61, 62.

Figure 22:
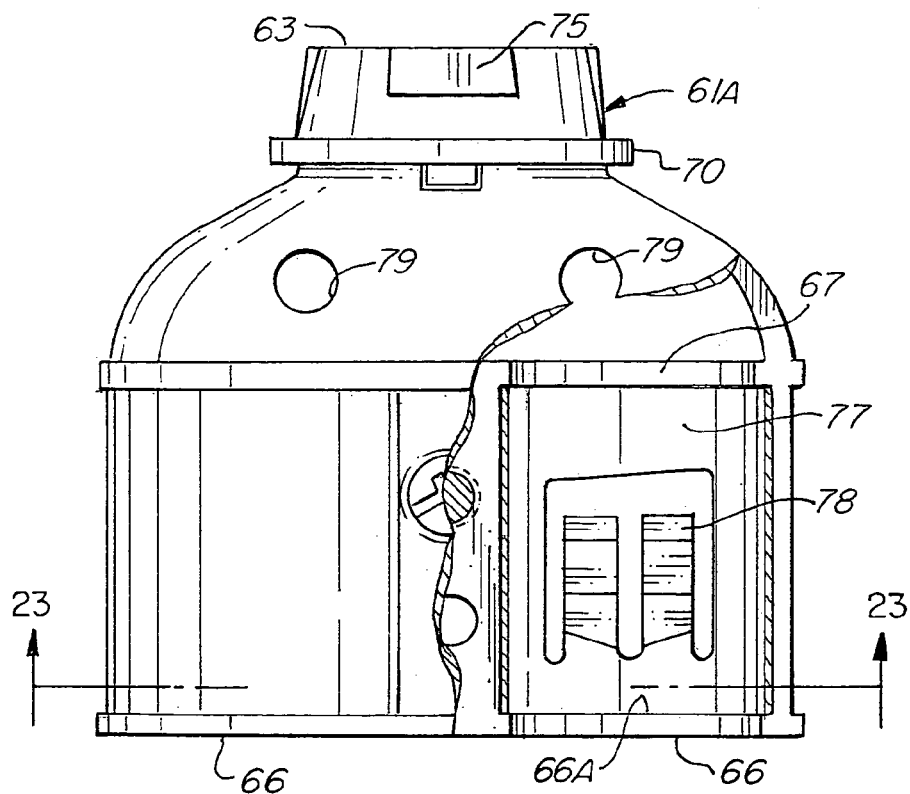
FIG. 22 is a top plan view of the embodiment of FIG. 20 having parts thereof broken away.
Figure 23:
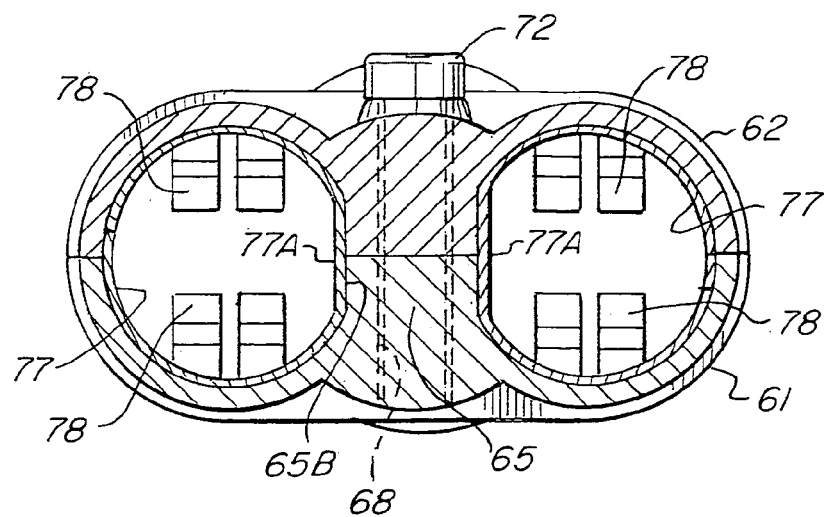
FIG. 23 is a sectional view taken along line 23—23 on FIG. 22.
Figure 24:
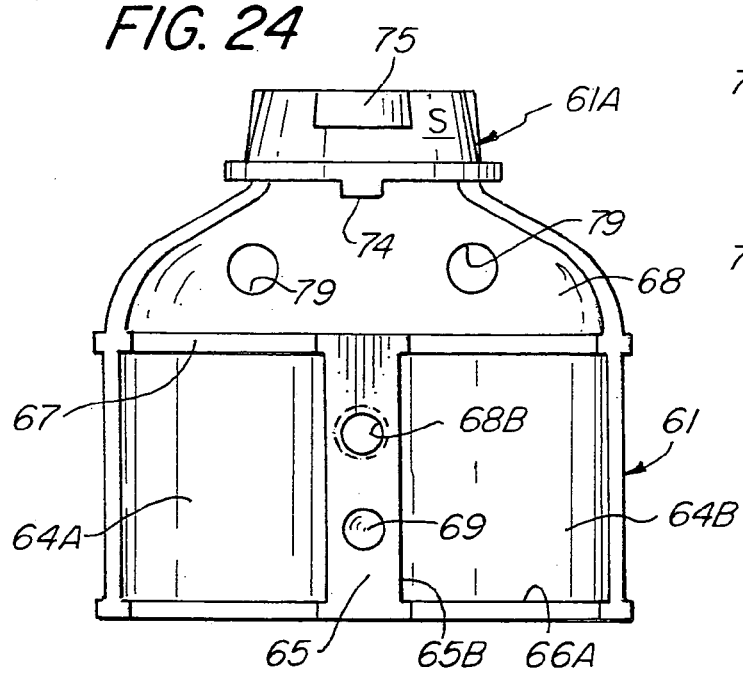
FIG. 24 is the interior plan view of one section of the connector housing of the embodiment illustrated in FIG. 20.
Figure 25:
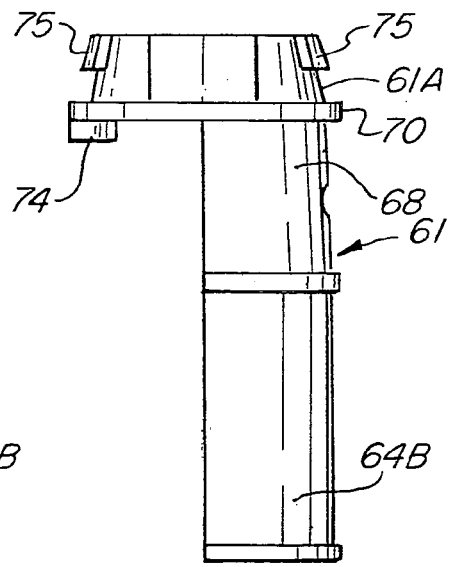
FIG. 25 is an outer end view of FIG. 24.
Figure 26:
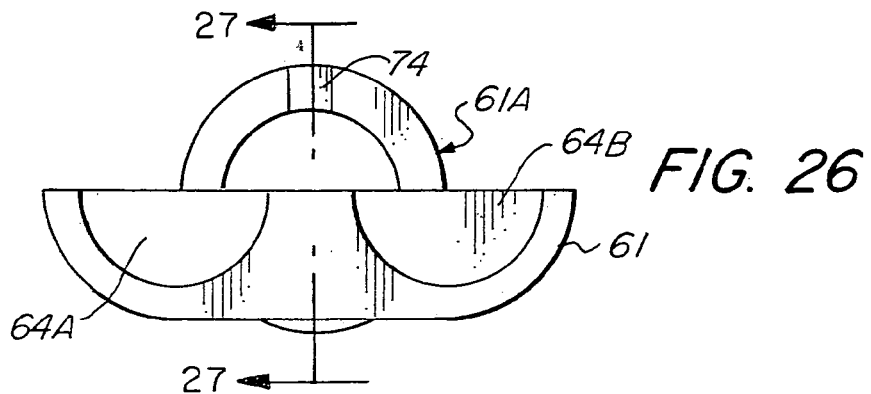
FIG. 26 is an end view of the connector housing section of FIG. 24.
Figure 27:
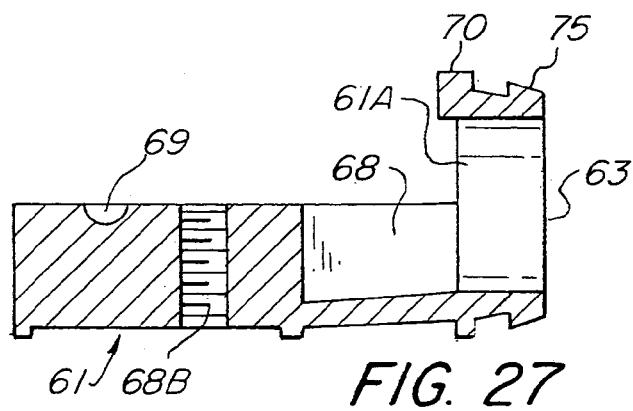
FIG. 27 is a sectional view of the housing section taken along line 27—27 on FIG. 26.
Figure 38:
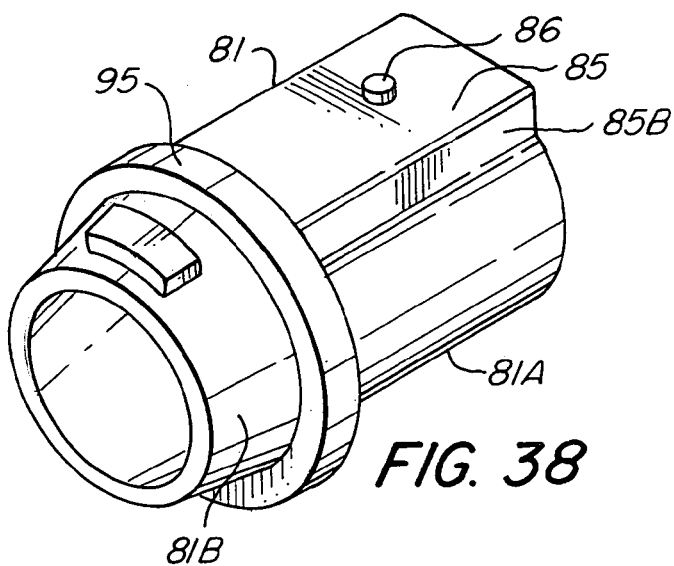
FIG. 38 is a perspective view of the connector body embodying the invention.
Figure 41:
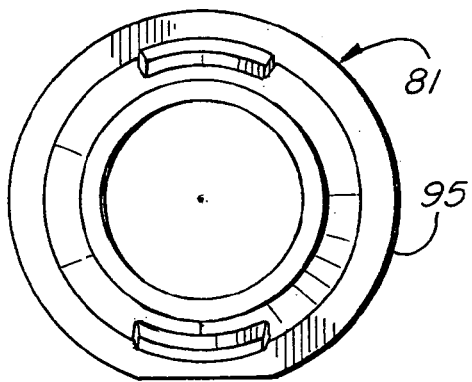
FIG. 41 is a left end view of FIG. 38.
Figure 39:
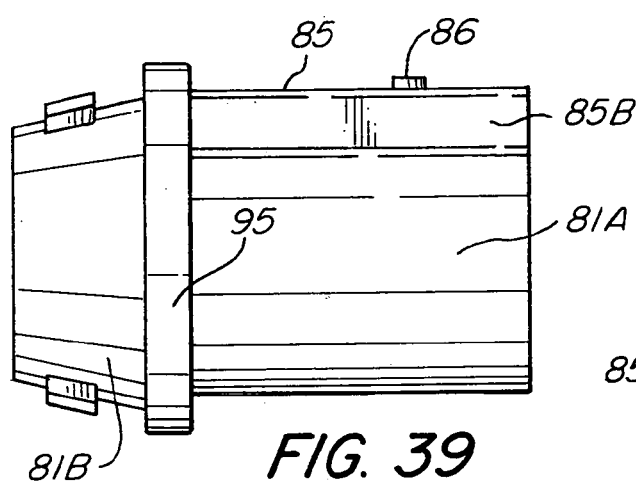
FIG. 39 is a side view of FIG. 38.
Figure 42:
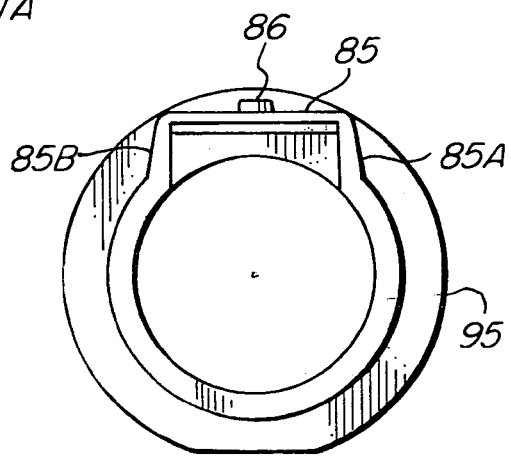
FIG. 42 is a right end view of FIG. 38.
Figure 40:
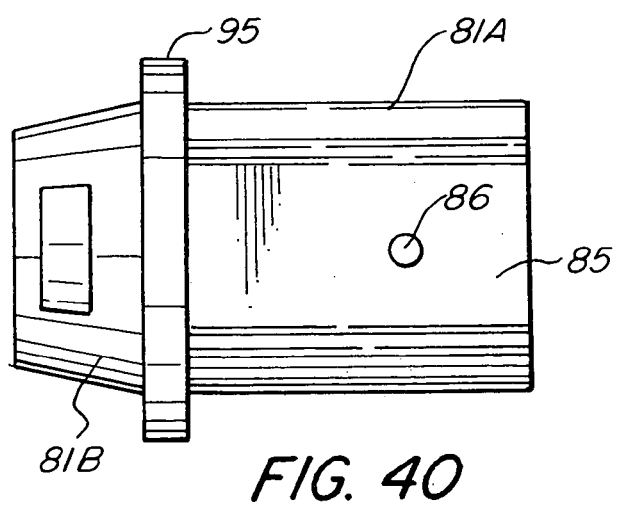
FIG. 40 is a top plan view of FIG. 39.

To assemble the connector 60 of FIGS. 20, 21, a formed conductor wire retainer ring 77 as hereinbefore described, is position in each semi-cylindrical chamber defined in one of the housing sections, e.g., as illustrated in FIG. 21 or 22; noting that the flat portion 77A of the respective wire conductor retainer sleeves 77 are positioned against the adjacent opposing surfaces 65B of the dividing wall 65, as best seen in FIG. 23. In this position, the opposite ends of the respective sleeves 77 abut the interior lip 66A adjacent the inlet opening and the transverse web 67. With the wire retainer rings 77 thus positioned within their respective chamber, the other housing member, e.g. member 62, is fitted to housing member 61 whereby the respective housing sections clamp the respective wire retaining sleeves 77 therebetween as the fastening screw 72 is rotated to secure the two housing sections together as shown in FIGS. 20 and 23. It will be noted that the outer diameter (OD) of the wire retainer sleeves 77 are substantially equal to or slightly greater than the internal diameter of the respective chambers in the assembly position of the housing sections 61, 62, as noted in FIGS. 20 and 23. The arrangement is such that the respective retainer sleeves 77 are firmly secured within their respective chamber, when assembled, so that the wire retainer sleeves are prohibited from being separated from the connector body or housing. With the housing members 61, 62 thus secured, the external retainer ring 76 can be readily fitted onto the leading end 61A of the connector body or housing, as hereinbefore described.

With the connector body of FIG. 20 thus assembled, it will be noted that the connector assembly 60 can be readily secured to an electric box or panel simply by inserting the leading or outlet end 61A through a knockout hole of a panel or electrical box so as to be readily secured thereto with a snap fit as hereinbefore described. Also with the arrangement described, a wire conductor or cable can be readily attached to the trailing end of the connector assembly 60 with a simple snap fit.

FIG. 20 illustrates a wire conductor having an external helically wound sheath or outer covering 80 which can be readily inserted through the inlet opening of one of the respective chambers formed in the trailing end whereby the gripping tangs 78 formed in the wire retainer sleeves 77, as hereinbefore described, securely grips the armored cable or wire conductors with a snap fit, the arrangement being such that the wire so secured is prohibited from becoming accidentally separated from the connector body, as hereinbefore described. While a conventional armored type conductor 80 is illustrated in FIG. 20, it will be understood that the described connector assembly herein can be suitable for use with other types of wire conductors, e.g. conductors having an external plastic or fabric like sheath.

By simply removing the single fastening 72, the entire assembly can be readily taken apart to effect the separation of the wire conductor if so desired. If desired, the transition portions 68, 68A of the respective housing sections 61, 62 may be provided with peep holes 70 to view the individual conductor wires 80A arranged within the connector body to facilitate an electrical installation.

From the foregoing, it will be noted that the connector assemblies disclosed herein utilize a frustro conically shaped outer retainer ring which is uniquely secured to the leading end of a connector body, with securing tangs and grounding tangs arranged to effect both a positive securement of the connector assembly to a knockout hole of an electric box or panel and a positive electrical ground. In association with an external frustro conical retaining ring, other disclosed embodiments include a trailing end constructed to receive one or more wire conductors and retaining the same to the connector body with a simple snap fit motion. While the embodiment of FIG. 20 has been illustrated and described as having a duplex trailing end portion, it will be understood that the subject matter described can be utilized with one or more chambers formed in the trailing end of the connector body described herein, depending upon the number of wire conductors one may wish to connect to a single connector body.

With respect to the embodiment of FIGS. 20 to 32, the arrangement is such that the connector body, being formed of two component housing sections, and secured together with a fastener as described imparts a clamping force onto the spring steel wire retaining ring or sleeve with a surface to surface contact to enhance electrical conductivity or grounding between the component housing sections, and the wire retaining sleeves clamped therebetween.

FIGS. 33 to 44 illustrate a further modification of the invention. In this embodiment, the connector assembly 80 includes a connector body 81, an outer frustro conical external snap-fit retainer ring 82, a wire retainer device 83, and an optional plastic electrical insulating end ring insert 84.

Figure 43:
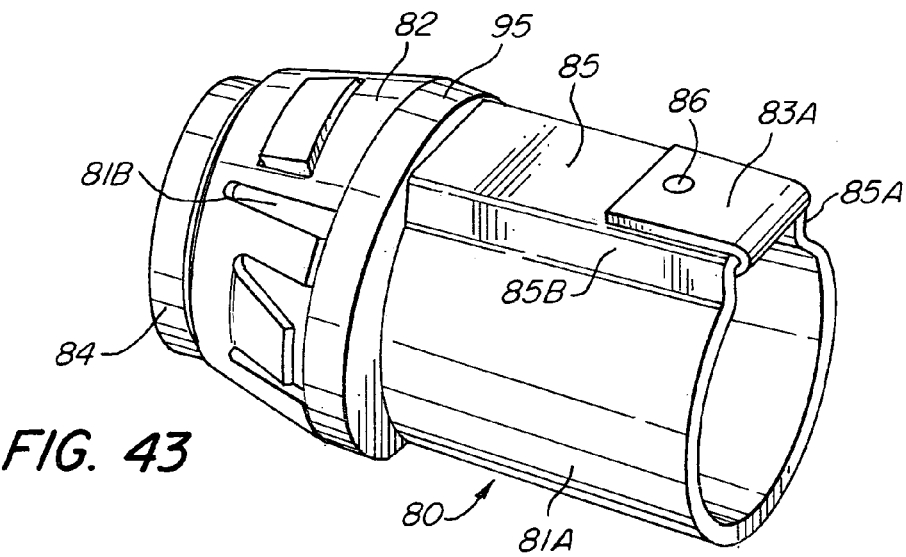
FIG. 43 is a perspective view of the assembled connector embodiment shown in FIG. 33.

As shown, the connector body 81 includes an inlet portion 81A and an outlet portion 81B, formed as a casting of a suitable metal, e.g. zinc or other suitable metal alloy. The inlet portion 81A, for the greater portion thereof, is defined by a cylindrical body having a circumference which is greater than 180°, and preferably about 320° plus or minus a few degrees. The open portion of the cylindrical body defining the inlet end portion 81A, as viewed in FIGS. 33 and 43, is provided with a flat closure 85 which is integrally connected to the opposed edges of the cylindrical body by interconnecting opposed side walls 85A and 85B. Projecting outwardly of the flat closure 85 is an anchoring pin or boss 86.

The outlet portion 81B comprises a frustro conical end similar to that hereinbefore described with respect to the embodiments of FIGS. 1, 11, 19 and 21. Also, the external snap fit ring 82 adapted to be disposed about the outlet end portion 81B is structurally and functionally similar to that hereinbefore described, and need not be repeated.

Figure 44:
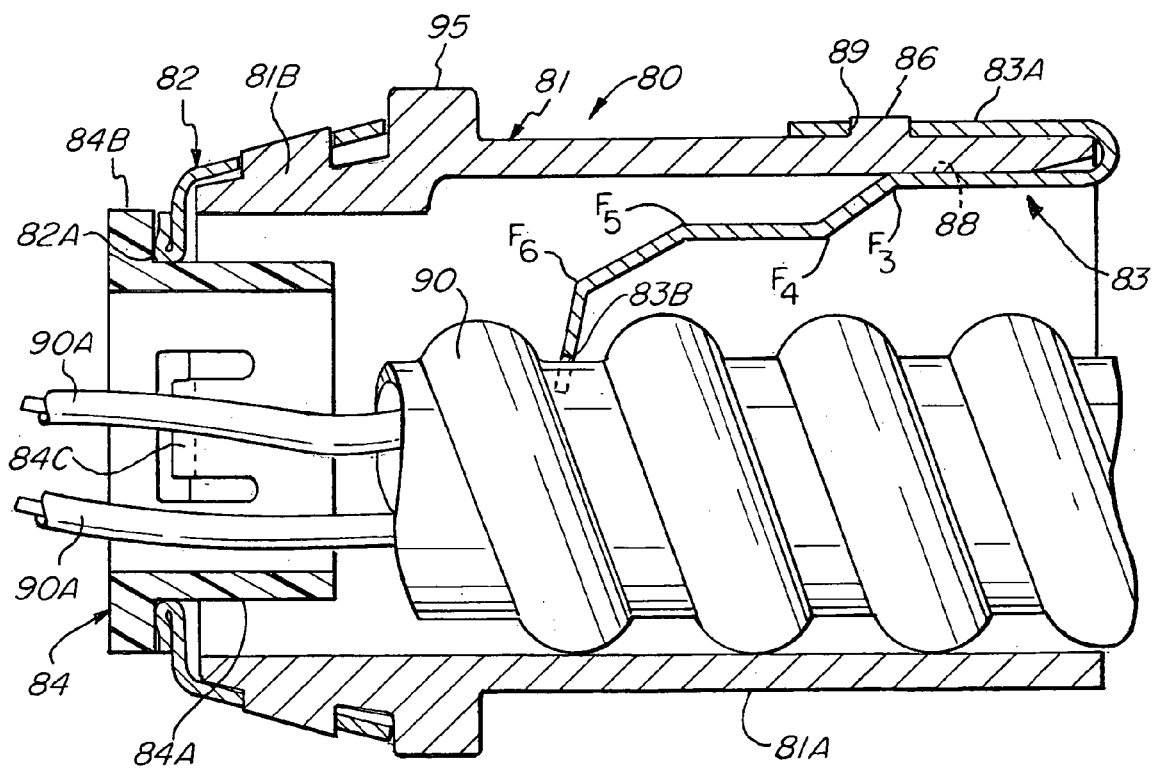
FIG. 44 is a side sectional view of the connector assembly of FIG. 43.

In the embodiment of FIGS. 33 and 44, a wire retainer or device 83 is arranged to extend into the inlet portion 81A, whereby a wire conductor 90, adapted to be inserted into the inlet portion 81A, is retained therein merely by inserting the wire conductor into the inlet end portion 81A. The arrangement is such that the wire conductor 90, once inserted into the inlet portion 81A and past the free end 83C of the wire retainer 83, positively retains the wire conductor 90 so as to prohibit any unintentional separation of the wire conductor 90 from the connector body 81, as best seen in FIG. 44.

The wire or conductor retainer 83 is formed from an elongated rectangular blank 87, preferably a blank of spring steel. The blank 87 is provided with a plurality of longitudinally spaced apart transverse foldlines $F_1$ to $F_6$, whereby the blank 87 can be readily formed to define the spring steel retainer 83.

As shown, the elongated blank 87, intermediate the length thereof and adjacent the longitudinal edges 87A, 87B, is provided with die cut or slit 87C to form opposed projecting prongs 88 that are bent out or project beyond the plane of the blank 87. The right end of the blank 81, as seen in FIG. 35, is reversely bent or folded about foldlines $F_1$ and $F_2$ so as to overlie the projecting prongs 88, as best seen in FIG. 36, whereby the reversely bent end 83A is spaced above the projecting prongs 88. Formed in the bent end 83A is an aperture or hole 89 which is positioned to receive anchor pin or boss 86 in the assembled position. The portion of the blank 87 to the left of the prongs 88 are bent about transverse foldlines $F_3$, $F_4$, $F_5$ and $F_6$ at longitudinally spaced intervals to configure the blank 87 with a series of angular bends, as shown in FIG. 36. The angle of respective bends about the respective foldlines $F_3$ to $F_6$ is not critical and may vary depending upon the internal diameter of the inlet end 81A. As shown in FIG. 44, the retainer device 83 may be angularly bent so that the free end 83B extends to a position sufficient to engage the wire conductor or the wire covering or sheath 90, as noted in FIG. 44.

In the illustrated embodiment, the wire conductor, as shown, includes a typical helically wound metallic sheath or covering 90 that houses the conducting insulated wires 90A. To facilitate the retention of the sheath 90, the free end of the retainer device 83 may terminate in a curvilinear arc 83B to complement the circumference of the sheath 90 disposed between the adjacent helical ridges as best seen in FIG. 44.

To assemble the wire retainer 83 to the inlet portion 81A of the connector body 81, the reversely bent end portion is fitted to or clipped onto the end of the flat closure or top 85, as best seen in FIGS. 43 and 44 so that the anchoring pin 86 is received in the hole 89. To secure the retainer device 83 to the connector body 80, the top of the anchor pin is swedged so as to deform the end of the anchor pin 86, whereby the deformation of the anchor pin 86 firmly and fixedly secures the retainer device 83 to the connector body. In the swedging operation, the prongs 88 formed in the blank 87 are caused to "bite" into the under surface of the flat closure or top 85, as best seen in FIG. 44, to enhance the attachment of the retainer device 83 to the connector body 81. To complete the assembly of the connector assembly, the frustro conical external ring 82 is snap fitted onto the conically formed outer end portion 81B as hereinbefore described. While the means for securing the wire retainer 83 to the connector body portion 81A is described by means of a swedged pin, it will be understood that other suitable fastening means may be used, e.g. screws, bolts, welding, solder and the like.

As will be best noted in FIG. 44, the retainer device is so formed that the free end 83B is arranged to extend into the inlet portion 81A of the connector body 81 and is angularly disposed so as to enable a wire conductor or sheathing 90 to be unidirectionally inserted into the inlet end portion 81A so as to be retained by the free end 83A of the retaining device 83 in a manner whereby the wire conductor 90 is prohibited from being unintentionally separated from the connector body.

To effect the release of the wire conductor, one need only to insert an appropriate tool to effect displacement of the retainer device away form the wire conductor or covering sheath 90, to effect the withdrawal of the conductor sheath 90.

FIG. 37 illustrates a slightly modified wire retainer device 91. The modified wire retainer device 91 is similar to that the wire retainer 83, herein described, with the exception that the free end of the blank 91A is provided with an end notch 92 to define a pair of finger portions 93 for engaging and retaining a wire conductor, as hereinbefore described. In all other respects, the structure of embodiment FIG. 37 is similar to the wire retainer 83 as described.

To complete the connector assembly 80, an end ring insert 84 may be provided to protect the wire conductors 90A that extend beyond the outlet end 81B, as noted in FIG. 44. The illustrated ring inset 84 preferably formed of a suitable plastic, comprises a ring body 84A having an outwardly radially extending flange 84B. Blanked out of the plane of the ring body are opposed tangs 84C which are outwardly bent. The outer diameter of the ring body 84A is slightly smaller than the diameter of the opening 82A formed in the face portion of the external retainer ring 82. The arrangement is such that the ring insert 84 can be readily snap fitted to the opening 82A of the external retainer ring 82 and the outlet opening of the outlet end portion 81B. The insert body tangs 84C function to enable the ring insert 84 to be readily snap fitted to the outlet end portion 81A, so that the ring insert 84 is prohibited from being unintentionally separated therefrom.

Intermediate the opposed opening of the connector body, there is provided a radially outwardly projecting stop flange 95, which functions to limit the insertion of the connector assembly through a knock-out hole of an electric panel or electric box, as hereinbefore described.

While the present invention has been described with respect to several embodiments, it will be understood that various modifications may be made without departing from the spirit or scope of the invention.

What is claimed is:

1. An electric connector assembly comprising:
   a connector body having an inlet end portion, and an outlet end portion, a radially outward extending stop flange formed about an intermediate portion of said connector body, and a snap fit retaining ring having a face portion and an integrally connected circumscribing frustro-conical configuration wherein the diameter of the trailing end of said frustro-conical configuration is greater than the diameter of the leading end thereof, said circumscribing frustro-conical configuration includes a locking tang and a grounding tang formed out of the surface of said retaining ring, means for securing said retaining ring onto said outlet end portion of said connector body, and a wire conductor retainer connected to said inlet end portion of said connector body for effecting a unidirectional snap fit connector of a wire conductor thereto.

2. An electrical connector assembly as defined in claim 1 wherein said wire conductor retainer comprises:

an elongated blank having opposed ends, one end of said blank being reversely bent so as to be spaced from the remaining portion of said blank, and said remaining portion of said blank being angularly bent about transverse, spaced apart foldlines, and means for securing said reversely bent one end to said connector body externally thereof whereby said bent remainder portion with said angular bends extends into said inlet end portion of said connector body.

3. The connector assembly as defined in claim 2 wherein:

said securing means includes an anchor pin extending outwardly from an outer surface of said connector body adjacent said inlet end portion, and a complementary hole formed in said reversely bent end of said wire retainer, said complementary hole being arranged to receive said pin in the assembled position of said wire retainer.

4. An electrical connector assembly as defined in claim 3 wherein said anchor pin is deformable to secure the anchor pin within said hole.

5. An electrical connector assembly as defined in claim 1 wherein:

said inlet end portion includes a flattened surface, and a connected curvilinear portion, said anchor pin extending outwardly from said flattened surface, said reversely bent end of said wire retainer being clipped onto the end of said flattened portion so that said anchor pin is received in said hole of said reversely bent end of said wire retainer, and said remainder portion of said blank having said angular bends extending into said inlet portion for unidirectional retention of a wire conductor adapted to be inserted in said inlet end portion of said connector body.

6. An electrical connector as defined in claim 1 wherein said wire conductor retainer comprises:

an elongated blank formed of a resilient material having opposed ends and opposed longitudinal edges, said blank having opposed prongs projecting beyond the surface of said blank adjacent one end thereof, said one end being reversely bent to overlie in spaced relationship to said prongs, and the remaining portion of said blank being transversely bent at spaced apart intervals, said reversely bent end being clipped onto the inlet end portion of said connector body, said prongs providing a grip to maintain the wire retainer in place.

7. An electrical connector for effecting the connection of the electrical connector to an electric panel having a knockout opening with a unidirectional snap fit and for securing a wire conductor to the electrical connector with a unidirectional snap fit comprising:

a connector body having an inlet end portion having an inlet opening and an outlet end portion defining an outlet opening, a bore communicating said inlet opening to said outlet opening, an external snap fit retaining ring circumscribing said outlet end portion, said external snap fit retaining ring includes locking tangs and grounding tangs blanked out of the material of said retaining ring, and a wire conductor retainer connected to said inlet end portion, said wire conductor retainer comprising an elongated blank formed of a resilient spring material, said blank having opposed ends, one of said opposed ends being reversely bent so as to be spaced from the remaining portion of said blank, said remaining portion of said blank being angularly bent about spaced-apart transverse foldlines to extend into said bore of said inlet end portion, and securing means for connecting said wire conductor retainer to an external portion of said connector body.

8. An electrical connector as defined in claim 7 wherein said blank includes a prong blanked out of the plane of said blank adjacent said reversely bent end, said prong projecting beyond the surface of said blank, whereby said prong grips the internal surface of said inlet opening.

9. An electric connector as defined in claim 8 wherein said securing means includes:

an anchor pin projecting outwardly of the outer surface of said inlet end portion, and a hole formed in said reversely bent end of said wire retainer, said hole being arranged to receive said anchor pin in the assembled position.

10. An electric connector as defined in claim 9 wherein said anchor pin is deformable to secure said wire conductor retainer to an exterior surface of said outlet end portion, and said prong disposed to bite into the inner surface of said inlet end portion to maintain said wire retainer in place in the assembled position.

11. An electrical connector as defined in claim 7 and including an end ring insert fitted to said outlet opening of said outlet end portion, said ring insert including a ring body having an outer diameter slightly less than said outlet opening, a radial outwardly flange circumscribing said ring body, and outward projecting tangs formed out of the plane of said ring body for locking said ring insert in the inserted position to prohibit unintentional separation of said ring insert from said outlet opening.

12. An electrical connector assembly comprising:

a connector body having an inlet end portion with an inlet opening and an outlet end portion defining an outlet opening, a stop flange disposed between said inlet end portion and said outlet end portion, said outlet end portion having an outer frustro-conical surface, a frustro-conical external snap fit retainer ring circumscribing said outer frustro conical surface, means for detachably securing said external retainer ring on said outer frustro-conical surface, said inlet end portion including a curvilinear body portion and a flattened body portion, an anchor pin projecting outwardly of said flattened body portion adjacent to said inlet opening, a resilient conductor retainer, said conductor retainer including a reversely bent end portion to define a clip for attaching said wire retainer to said flattened portion of said inlet end portion at said inlet opening, whereby the remainder portion of said conductor retainer extends into said inlet end portion, and said reversely bent portion of said conductor retainer includes a hole for receiving said anchor pin in the assembled position for securing said conductor retainer to the exterior of said inlet end portion.

13. An electric connector as defined in claim 12 wherein said conductor retainer includes a projecting prong arranged to bite into the under surface of said flattened body portion of said inlet end portion.

14. An electric connector assembly for securing an electrical conductor to an electric box comprising:

a connector body having an inlet end portion, and an outlet end portion, and a bore extending therethrough, said outlet end portion terminating in an outlet opening for insertion through a knock out hole, said outlet end portion having an outer surface that slopes downward toward said outlet opening, a radially outward extending stop flange formed about an intermediate portion of said connector body, and a retaining ring having an integrally connected circumscribing frustro-conical configuration wherein the diameter of the trailing end of said frustro-conical configuration is greater than the diameter of the leading end thereof, said circumscribing frustro-conical configuration having a locking tang formed out of the surface of said ring and a grounding tang, means for securing said retaining ring onto said downwardly sloped outlet end portion of said connector body, and a wire conductor retaining means connected to said inlet end portion adjacent said inlet opening, said wire conductor retaining means being formed as an elongated strip of a resilient material, said strip including reverse fold at one end thereof to define a clip end arranged to be clipped onto said inlet end portion, and a remainder portion, said remainder portion being angularly bent at spaced apart intervals therealong so as to extend through said inlet opening and into said inlet end portion.

15. An electric connector as defined in claim 14 wherein said strip includes a projecting prong blanked out of said strip adjacent said clip end whereby, in the assembled position, said prongs engage the inner surface of said inlet end portion.

* * * * *